(12) United States Patent
Take

(10) Patent No.: US 7,982,966 B2
(45) Date of Patent: Jul. 19, 2011

(54) ZOOM LENS, OPTICAL APPARATUS, AND METHOD FOR FORMING AN IMAGE OF AN OBJECT

(75) Inventor: Toshinori Take, Yokohama (JP)

(73) Assignee: Nikon Corporation, Kawasaki-shi (JP)

( * ) Notice: Subject to any disclaimer, the term of this patent is extended or adjusted under 35 U.S.C. 154(b) by 451 days.

(21) Appl. No.: 12/044,903

(22) Filed: Mar. 7, 2008

(65) Prior Publication Data

US 2008/0218876 A1 Sep. 11, 2008

(30) Foreign Application Priority Data

Mar. 9, 2007 (JP) ................................. 2007-061055
Apr. 5, 2007 (JP) ................................. 2007-099529

(51) Int. Cl.
*G02B 15/14* (2006.01)
(52) U.S. Cl. ......................... 359/683; 359/676; 359/687
(58) Field of Classification Search .................. 359/676, 359/683, 687
See application file for complete search history.

(56) References Cited

U.S. PATENT DOCUMENTS

| | | | |
|---|---|---|---|
| 6,091,551 A | 7/2000 | Watanabe | |
| 7,068,429 B1 | 6/2006 | Ori | |
| 7,274,516 B2 | 9/2007 | Kushida et al. | |
| 7,327,953 B2 | 2/2008 | Tamura | |
| 7,443,607 B2 | 10/2008 | Kushida | |
| 2003/0161620 A1 | 8/2003 | Hagimori et al. | |
| 2004/0027685 A1* | 2/2004 | Mihara et al. | 359/686 |
| 2005/0195482 A1 | 9/2005 | Yamada et al. | |
| 2005/0259329 A1* | 11/2005 | Yagyu et al. | 359/676 |
| 2005/0270646 A1 | 12/2005 | Yamada et al. | |
| 2006/0285221 A1 | 12/2006 | Bito et al. | |
| 2007/0008418 A1 | 1/2007 | Kuroda et al. | |
| 2009/0002840 A1 | 1/2009 | Shirota | |

FOREIGN PATENT DOCUMENTS

| | | |
|---|---|---|
| CN | 1768290 A | 5/2006 |
| EP | 1717624 A | 11/2006 |
| EP | 1 870 757 A1 | 12/2007 |
| JP | 2006-184430 A | 7/1996 |
| JP | 10-213746 A | 8/1998 |
| JP | 2000-298235 A | 10/2000 |
| JP | 2005-84151 A | 3/2005 |
| JP | 2005-84283 A | 3/2005 |
| JP | 2006-171492 A | 6/2006 |
| JP | 2006-178193 A | 7/2006 |
| JP | 2006-195068 A | 7/2006 |
| JP | 2006-276475 A | 10/2006 |
| JP | 2007-93984 A | 4/2007 |

OTHER PUBLICATIONS

Extended European Search Report and Opinion from European Patent Appln. No. 08250722.

* cited by examiner

*Primary Examiner* — Scott J Sugarman
(74) *Attorney, Agent, or Firm* — Miles & Stockbridge P.C.

(57) ABSTRACT

In a zoom lens ZL having a plurality of lens groups which are disposed in order from an object, a first lens group that is disposed to closest to the object among the plurality of lens groups has positive refractive power and comprises a light path bending element which bends the path of light and a plurality of lens components which are disposed closer to the object than the light path bending element, and the plurality of lens components comprise at least one negative lens whose refractive index with respect to d-line exceeds 1.90.

24 Claims, 23 Drawing Sheets

ZOOM LENS, OPTICAL APPARATUS, AND METHOD FOR FORMING AN IMAGE OF AN OBJECT

INCORPORATION BY REFERENCE

This invention claims the benefit of Japanese Patent Applications No. 2007-061055 and 2007-099529 which is hereby incorporated by reference.

FIELD OF THE INVENTION

The present invention relates to a zoom lens that is used in an optical apparatus such as a digital still camera.

BACKGROUND OF THE INVENTION

Optical apparatuses such as digital still cameras and video cameras generally have a zoom lens mounted therein and a multiplicity of suitable zoom lenses have been proposed (See Japanese Patent Application Laid Open No. 2006-171492, for example). Nowadays, portability has become extremely important for optical apparatuses such as digital still cameras and steps toward miniaturizing zoom lenses which are photographic lenses and making zoom lenses lightweight have been taken in order to miniaturize the camera main body and render same thin and lightweight. Among such zoom lenses, a zoom lens in which a portion of the lens system comprises an optical element that is capable of bending the path of light through approximately 90 degrees has been proposed. By installing a zoom lens of this kind, where the transition is made from a housed state to a usage state, there is no protrusion from the camera main body, which affords superior portability in the usage state and also makes a large contribution toward creating a thinner and more miniature camera.

Further, a large number of zoom lenses that comprise an optical element that makes it possible to bend the path of light through approximately 90 degrees excel with respect to miniaturization and the production of a thinner camera and, therefore, a focal length of the zoom lens in the wide-angle end state is large and an enlargement of the field of view is ignored. Hence, users have been able to photograph over a wider range and obtain results of a perspective that is closer to the photographic object. Conventional zoom lenses that are capable of bending the path of light comprise a plurality of lens groups which is disposed in order from the object and a first lens group which is disposed to closest to the object among the plurality of lens groups is provided with a light path bending element which bends the path of light and a plurality of lens components which are disposed closer to the object than the light path bending element.

Problems to be Solved by the Invention

However, with a conventional zoom lens of this kind, there has been the problem that, if the lens component which is disposed closer to the object than the light path bending element is enlarged, the field of view cannot be enlarged and photography at the wide-angle end is restricted.

SUMMARY OF THE INVENTION

The present invention was conceived in view of this problem and an object of the present invention is to provide a zoom lens that is capable of obtaining a high image formation performance with a small-scale design and a wide field of view, an optical apparatus, and a method for forming an image of an object.

Means to Solve the Problems

In order to achieve this object, the zoom lens according to the present invention is a zoom lens constituted by a plurality of lens groups which are disposed in order from the object, wherein a first lens group that is disposed to closest to the object among the plurality of lens groups has positive refractive power and comprises a light path bending element which bends the path of light and a plurality of lens components which are disposed closer to the object than the light path bending element; and the plurality of lens components comprise at least one negative lens whose refractive index with respect to d-line exceeds 1.90.

In the above zoom lens, the following conditional expressions $$nd1 > 1.90 \text{ and } nd2 > 1.90$$

are preferably satisfied, where the refractive index with respect to d-line of a negative lens closest to the object among the plurality of lens components is $nd1$, and the refractive index with respect to d-line of the negative lens closest to the image among the plurality of lens components is $nd2$.

In the above zoom lens, the plurality of lens components is preferably two lenses.

In the above zoom lens, the following conditional expression $$0.7 < nd1/nd2 < 1.1$$

is preferably satisfied, where the refractive index with respect to d-line of the negative lens closest to the object among the plurality of lens components is $nd1$ and the refractive index with respect to d-line of the negative lens closest to the image among the plurality of lens components is $nd2$.

In the above zoom lens, the following conditional expressions $$vd1 < 50 \text{ and } vd2 < 50$$

are preferably satisfied, where the Abbe number with respect to d-line of the negative lens closest to the object among the plurality of lens components is $vd1$, and the Abbe number with respect to d-line of the negative lens closest to the image among the plurality of lens components is $vd2$.

In the above zoom lens, the following conditional expression $$0.4 < vd1/vd2 < 1.3$$

is preferably satisfied, where the Abbe number with respect to d-line of the negative lens closest to the object among the plurality of lens components is $vd1$ and the Abbe number with respect to d-line of the negative lens closest to the image among the plurality of lens components is $vd2$.

In the above zoom lens, the following conditional expression $$L1/Lp < 1.0$$

is preferably satisfied, where the light path bending element is a prism and the distance on an optical axis from the surface closest to the object to the prism in the first lens group is $L1$ and the distance on the optical axis of the prism is $Lp$.

In the above zoom lens, the following conditional expression $$1.9 < f1/(-f2) < 2.5$$

is preferably satisfied, where the focal length of the first lens group is f1 and the focal length of the second lens group which is disposed to an image side of the first lens group among the plurality of lens groups is f2.

In the above zoom lens, a second lens group which is disposed to an image side of the first lens group among the plurality of lens groups has negative refractive index; and the following conditional expression $$1.2<(-f2)/fw<1.8$$

is preferably satisfied, where a focal length of the zoom lens in the wide-angle end state is fw and the focal length of the second lens group is f2.

In the above zoom lens, the following conditional expression $$ndp>1.80$$

is preferably satisfied, where the light path bending element is a prism and the refractive index with respect to d-line of the prism is ndp.

In the above zoom lens, the plurality of lens groups preferably comprise, in order from the object, the first lens group, a second lens group, a third lens group, and a fourth lens group.

In the above zoom lens, the second lens group preferably has negative refractive power, the third lens group preferably has positive refractive power, and the fourth lens group preferably has positive refractive power.

In the above zoom lens, the first lens group and the third lens group are preferably fixed during zooming from the wide-angle end to the telephoto end; and the second lens group and the fourth lens group preferably move along the optical axis during zooming from the wide-angle end to the telephoto end.

In the above zoom lens, the plurality of lens components preferably comprises a negative meniscus lens having a convex surface facing the object.

In the above zoom lens, the first lens group preferably comprises a positive lens which is disposed closer to the image than the light path bending element.

In the above zoom lens, the first lens group preferably has a lens component with an aspherical surface.

In the above zoom lens, the field of view in the wide-angle end state is preferably equal to or more than 75 degrees.

The optical apparatus according to the present invention is an optical apparatus having a zoom lens that forms an image of an object on a predetermined surface, wherein the zoom lens comprises the above zoom lens.

The method for forming an image of an object according to the present invention is an method for forming an image of an object that uses a zoom lens which has a plurality of lens groups which is disposed in order from the object to form an image of the object on a predetermined surface, wherein a first lens group which is disposed to closest to the object among the plurality of lens groups is afforded positive refractive power; the first lens group is provided with a light path bending element which bends the path of light and a plurality of lens components are disposed closer to the object than the light path bending element; and the plurality of lens components comprise at least one negative lens whose refractive index with respect to d-line exceeds 1.90.

In the above method, the following conditional expressions $$nd1>1.90 \text{ and } nd2>1.90$$

are preferably satisfied, where the refractive index with respect to d-line of a negative lens closest to the object among the plurality of lens components is nd1, and the refractive index with respect to d-line of the negative lens closest to the image among the plurality of lens components is nd2.

In the above method, the plurality of lens components is preferably two lenses.

In the above method, the following conditional expression $$0.7<nd1/nd2<1.1$$

is preferably satisfied, where the refractive index with respect to d-line of the negative lens closest to the object among the plurality of lens components is nd1 and the refractive index with respect to d-line of the negative lens closest to the image among the plurality of lens components is nd2.

In the above method, the following conditional expressions $$vd1<50 \text{ and } vd2<50$$

are preferably satisfied, where the Abbe number with respect to d-line of the negative lens closest to the object among the plurality of lens components is vd1, and the Abbe number with respect to d-line of the negative lens closest to the image among the plurality of lens components is vd2.

In the above method, the following conditional expression $$0.4<vd1/vd2<1.3$$

is preferably satisfied, where the Abbe number with respect to d-line of the negative lens closest to the object among the plurality of lens components is vd1 and the Abbe number with respect to d-line of the negative lens closest to the image among the plurality of lens components is vd2.

In the above method, the following conditional expression $$L1/Lp<1.0$$

is preferably satisfied, where the light path bending element is a prism, and the distance on the optical axis from the surface closest to the object to the prism in the first lens group is L1 and the distance on the optical axis of the prism is Lp.

In the above method, the following conditional expression $$1.9<f1/(-f2)<2.5$$

is preferably satisfied, where the focal length of the first lens group is f1 and the focal length of the second lens group which is disposed to an image side of the first lens group among the plurality of lens groups is f2.

In the above method, the following conditional expression $$1.2<(-f2)/fw<1.8$$

is preferably satisfied, where the second lens group which is disposed to an image side of the first lens group among the plurality of lens groups has negative refractive index and a focal length of the zoom lens in the wide-angle end state is fw and the focal length of the second lens group is f2.

In the above method, the following conditional expression $$ndp>1.80$$

is preferably satisfied, where the light path bending element is a prism, and the refractive index with respect to d-line of the prism is ndp.

In the above method, the plurality of lens groups preferably comprise, in order from the object, the first lens group, a second lens group, a third lens group, and a fourth lens group.

In the above method, the second lens group preferably has negative refractive power, the third lens group preferably has positive refractive power, and the fourth lens group preferably has positive refractive power.

In the above method, the first lens group and the third lens group are preferably fixed during zooming from the wide-angle end to the telephoto end; and the second lens group and the fourth lens group preferably move along the optical axis during zooming from the wide-angle end to the telephoto end.

In the above method, the plurality of lens components preferably comprises a negative meniscus lens having a convex surface facing the object.

In the above method, the first lens group preferably comprises a positive lens which is disposed closer to the image than the light path bending element.

In the above method, the first lens group preferably has a lens component with an aspherical surface.

In the above method, the field of view in the wide-angle end state is preferably equal to or more than 75 degrees.

Advantageous Effects of the Invention

The present invention makes it possible to obtain a high image formation performance with a small scale design and a wide field of view.

Further scope of applicability of the present invention will become apparent from the detailed description given hereinafter. However, it should be understood that the detailed description and specific examples, while indicating preferred examples of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EXAMPLES

Figure 1A:
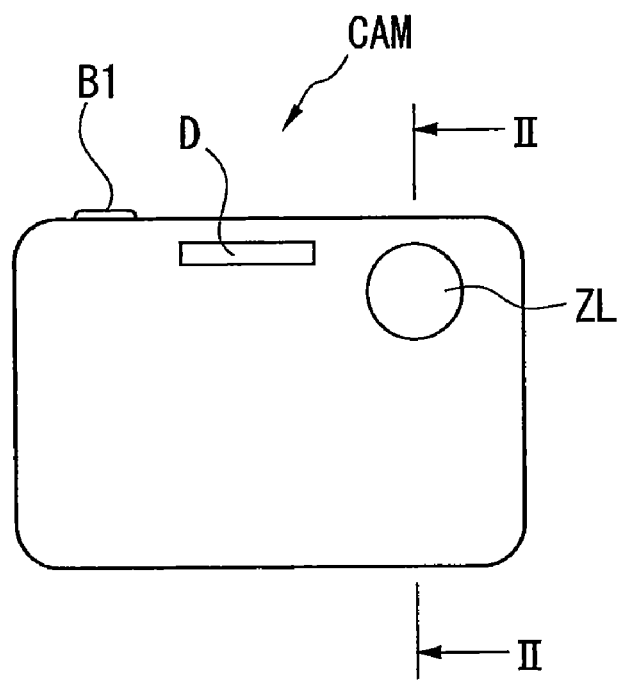
FIG. 1A is a front view of a digital still camera.
Figure 1B:
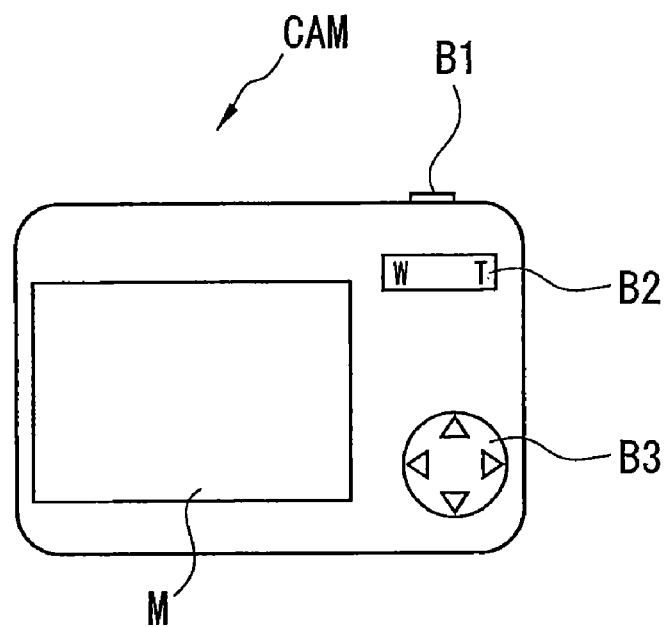
FIG. 1B is a rear view of the digital still camera.
Figure 2:
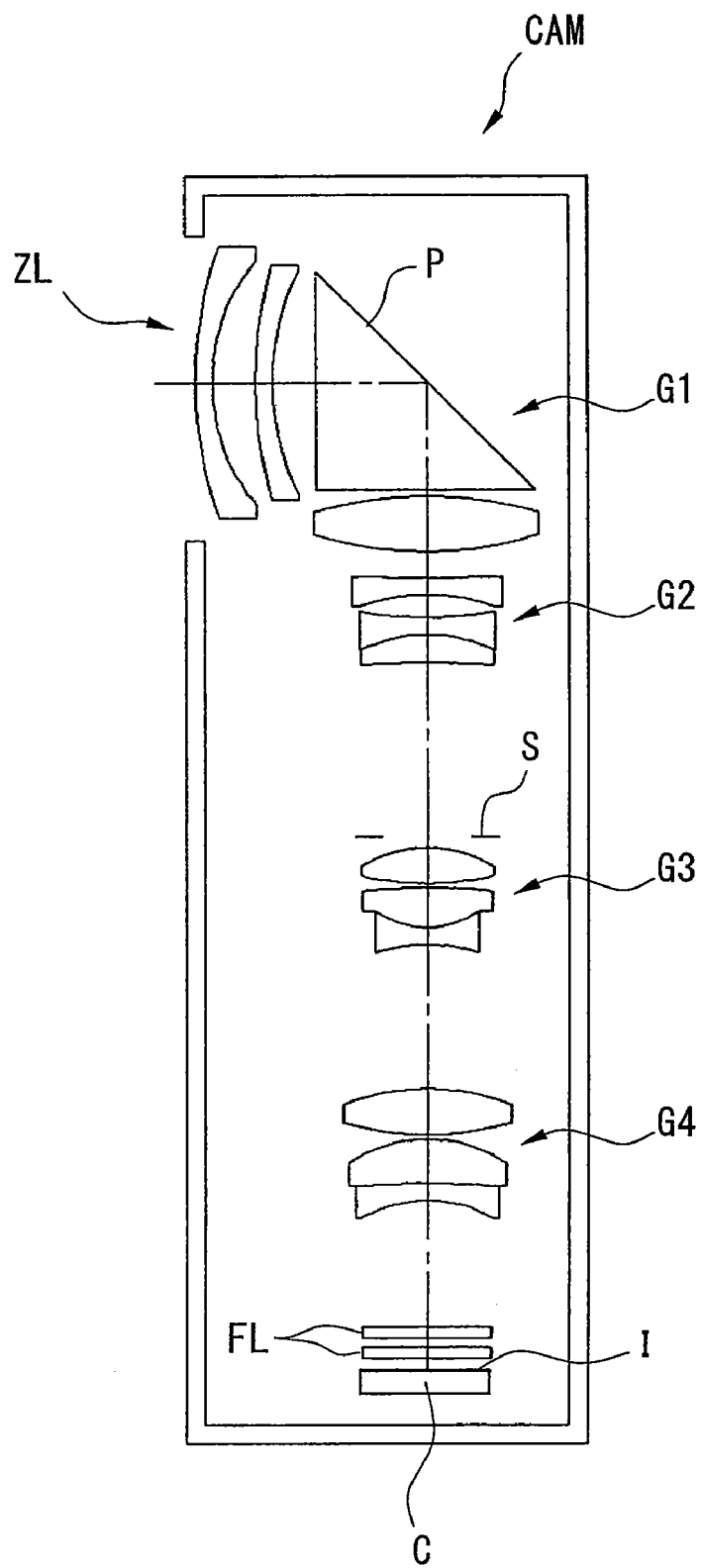
FIG. 2 is a cross-sectional view along arrow II-II in FIG. 1A.

Preferred examples of the present invention will be described hereinbelow with reference to the drawings. The digital still camera CAM which comprises the zoom lens ZL according to this application is shown in FIG. 1. FIG. 1A shows a front view of the digital still camera and FIG. 1B shows a rear view thereof. FIG. 2 is a cross-sectional view along the line II-II in FIG. 1A and provides an overview of the zoom lens ZL (described subsequently).

Where the power button (not shown) of the digital still camera CAM shown in FIGS. 1 and 2 is pushed, the shutter (not illustrated) of the photographic lens (ZL) is opened such that the light from the photographic object (object) is condensed by the photographic lens (ZL) and an image is formed on an image pickup apparatus C disposed on the imaging surface I. The image of the photographic object formed on the image pickup apparatus C is displayed on a liquid crystal monitor M which is disposed to the rear of the digital still camera CAM. The photographer determines a view of the photographic object while viewing the liquid crystal monitor M and then pushes the release button B1 to photograph the photographic object by means of the image pickup apparatus C and saves this image by recording same to memory (not illustrated).

The photographic lens comprises the zoom lens ZL according to this application and the path of the light that enters from the front side of the digital still camera CAM is bent downward through approximately 90 degrees by the light path bending element P in the zoom lens ZL (downward on the page of FIG. 2). The digital still camera CAM can therefore be made thinner. Furthermore, disposed in the digital still camera CAM are an auxiliary light-emitting portion D that emits auxiliary light in cases where the photographic object is dark, a wide (W)/telephoto (T) button B2 where zooming the zoom lens ZL from a wide-angle end state (W) to a telephoto end state (T) and a function button B3 that is used where setting various conditions for the digital still camera CAM.

The zoom lens ZL comprises, in order from the object, a first lens group G1 which has positive refractive power and comprises the light path bending element P, a second lens group G2 which has negative refractive power, a third lens group G3 which has positive refractive power, and a fourth lens group G4 which has positive refractive power. During zooming from the wide-angle end to the telephoto end, the first lens group G1 and the third lens group G3 are fixed to the imaging surface I and, as a result of the second lens group G2 and the fourth lens group G4 moving along the optical axis, the distance between the first lens group G1 and the second lens group G2 increases, the distance between the second lens group G2 and the third lens group G3 decreases, and the distance between the third lens group G3 and the fourth lens group G4 decreases. Further, the filter group LP constituted by a lowpass filter and infrared cut filter or the like is disposed between the zoom lens ZL and the imaging surface I.

The first lens group G1 acts to bend the path of light through approximately 90 degrees and acts to converge the light beam. During zooming from the wide-angle end to the telephoto end, the first lens group G1 is always fixed. Thus, the first lens group G1 is the largest among the lens groups which constitute the zoom lens ZL and can be structurally simplified in order to render mobile a heavy first lens group G1.

Furthermore, the second lens group G2 acts to enlarge the image of the photographic object (object) formed by the first lens group G1 and raises the rate of magnification by increasing the distance between the first lens group G1 and the second lens group G2 in moving from the wide-angle end state to the telephoto end state, whereby the focal length is changed.

The third lens group G3 acts to converge the light beam that has been enlarged by the second lens group G2 and, for the sake of achieving a higher performance, the third lens group G3 comprises a plurality of lens components and a state where spherical aberrations, sine conditions and the Petzval sum are favorably corrected is achieved.

The fourth lens group G4 acts to converge the light beam that has been converged by the third lens group G3 and, by actively changing the distance between the third lens group G3 and the fourth lens group G4 where the focal length is changed (during zooming) from the wide-angle end state to the telephoto end state, a change in the imaging surface with respect to a change in the focal length can be suppressed.

In zoom lens ZL which comprises a plurality of such lens groups, the first lens group G1 which is disposed to closest to the object among the plurality of lens groups has positive refractive power and comprises a light path bending element P which bends the path of light and a plurality of lens components which are disposed closer to the object than the light path bending element P, and the plurality of lens components preferably comprises at least one negative lens whose refractive index with respect to d-line exceeds 1.90. Accordingly, because the refractive index of the lens component which is disposed closer to the object than the light path bending element P is then high, the field of view at the wide-angle end can be enlarged without increasing the effective diameter and the outside diameter of the lens component.

In addition, where the refractive index is higher than 1.90, because the radius of curvature of the lens component can be increased in order to render the curve a gentle curve, the distance on the optical axis between the plurality of lens components can be reduced in order to make it possible to miniaturize the first lens group G1 and the whole of the zoom lens ZL. In addition, because the plurality of lens components are disposed closer to the object than the light path bending element P, the spherical aberration and coma aberrations which occur in the first lens group G1 alone can be favorably corrected. Thus, a zoom lens ZL which possesses a high image formation performance with a small design and with a wide field of view and an optical apparatus (the digital still camera CAM) which comprises the zoom lens ZL can be obtained.

Here, where the refractive index with respect to d-line of the negative lens closest to the object among the plurality of lens components is nd1 and the refractive index with respect to d-line of the negative lens closest to the image is nd2, the conditions represented by the conditional expression (1) and conditional expression (2) below are preferably satisfied.

$$nd1 > 1.90 \quad (1)$$

$$nd2 > 1.90 \quad (2)$$

Conditional expression (1) and conditional expression (2) are conditional expressions which prescribe a suitable refractive index range for the negative lens closest to the object and the negative lens closest to the image which are disposed closer to the object than the light path bending element P in the first lens group G1. In cases where the conditions of conditional expression (1) and conditional expression (2) are not satisfied, the lens closer to the object than the light path bending element P is enlarged. That is, the size of the effective diameter and outside diameter of the negative lens in the first lens group G1 is then large and the length from the light path bending element P to the lens surface which is closest to the object is then long. As a result, the thickness of the camera main body is then large, which is disadvantageous. In addition, correction of the coma aberration is difficult and a high optical performance can no longer be obtained.

In order to make the results of this application reliable, the lower limit value of conditional expression (1) and conditional expression (2) is more preferably 1.91. In addition, in order to make the results of this application reliable, the lower limit value of conditional expression (1) and conditional expression (2) is more preferably 1.92.

Further, a plurality of lens components are preferably two lenses. Thus, the first lens group G1 can be constituted by means of the minimum number of constituent elements.

Furthermore, where the refractive index with respect to d-line of the negative lens closest to the object among the plurality of lens components is nd1 and the refractive index with respect to d-line of the negative lens closest to the image is nd2, the condition represented by the following conditional expression (3) is preferably satisfied:

$$0.7 < nd1/nd2 < 1.1 \quad (3)$$

Conditional expression (3) is a conditional expression that prescribes a combination of optical material characteristics of the negative lens closest to the image and the negative lens closest to the object, which are disposed closer to the object than light path bending element P in the first lens group G1. In cases where there is a condition for raising the upper limit value of conditional expression (3), the size of the effective diameter and outside diameter of the negative lens in the first lens group G1 then increases and the camera main body is then large, which is disadvantageous. In addition, correction of the coma aberration is difficult and a high optical performance can no longer be achieved. However, in cases where there is a condition to lower the lower limit value of conditional expression (3), the lens which is closer to the object than the light path bending element P is enlarged and, as a result, also affects the thickness of the camera main body. In addition, the lateral chromatic aberration which occurs in the first lens group G1 worsens, which is disadvantageous.

In order to render the results of this application reliable, the upper limit value of conditional expression (3) is more preferably 1.07. In addition, in order to make the results of this application reliable, the upper limit value of conditional expression (3) is more preferably 1.05. Further, in order to afford the results of this application greater reliability, the lower limit value of conditional expression (3) is more preferably 0.8. In addition, in order to make the results of this application reliable, the lower limit value of conditional expression (3) is more preferably 0.9. Furthermore, in order to afford the results of this application greater reliability, the lower limit value of conditional expression (3) is more preferably 0.95.

Furthermore, where the Abbe number with respect to d-line of the negative lens closest to the object among the plurality of lens components is vd1 and the Abbe number with respect to d-line of the negative lens closest to the image is vd2, the conditions represented by the following conditional expressions (4) and (5) are preferably satisfied:

$$vd1<50 \quad (4)$$

$$vd2<50 \quad (5)$$

Conditional expressions (4) and (5) are conditional expressions which prescribe suitable ranges for the optical materials of the negative lens closest to the image and the negative lens closest to the object, which are disposed closer to the object than light path bending element P in the first lens group G1. In cases where the conditions of conditional expressions (4) and (5) are not satisfied, correction of on-axis chromatic aberration and lateral chromatic aberration which are produced in the first lens group G1 alone is difficult. High optical performance can then no longer be obtained.

In order to render the results of this application more reliable, the upper limit value of the conditional expression (4) and conditional expression (5) is more preferably 37.0. In addition, in order to make the results of this application reliable, the upper limit value of conditional expression (4) and conditional expression (5) is more preferably 34.0. Further, in order to afford the results of this application greater reliability, the upper limit values of conditional expression (4) and conditional expression (5) is more preferably 32.0. In addition, in order to afford the results of this application greater reliability, the upper limit values of conditional expression (4) and conditional expression (5) is more preferably 30.0.

In addition, where the Abbe number with respect to d-line of negative lens closest to the object among the plurality of lens components is vd1 and the Abbe number with respect to d-line of the negative lens closest to the image is vd2, the condition represented by the following conditional expression (6) is preferably satisfied:

$$0.4<vd1/vd2<1.3 \quad (6)$$

Conditional expression (6) is a conditional expression that prescribes a combination of optical material characteristics of the negative lens closest to the image and the negative lens closest to the object, which are disposed closer to the object than light path bending element P in the first lens group G1. In cases where there is a condition for raising the upper limit value of conditional expression (6), the size of the effective diameter and outside diameter of the negative lens in the first lens group G1 then increases and the camera main body is then large, which is disadvantageous. In addition, correction of the coma aberration is difficult and a high optical performance can no longer be achieved. However, in cases where there is a condition to lower the lower limit value of conditional expression (6), the lens which is closer to the object than the light path bending element P is enlarged and, as a result, also affects the thickness of the camera main body. In addition, the lateral chromatic aberration which occurs in the first lens group G1 worsens, which is disadvantageous.

In order to render the results of this application more reliable, the upper limit value of conditional expression (6) is more preferably 1.07. In addition, in order to afford the results of this application greater reliability, the upper limit value of conditional condition (6) is more preferably 1.05. In addition, in order to afford the results of this application greater reliability, the lower limit value of conditional expression (6) is more preferably 0.93. Moreover, in order to render the results of this application reliable, the lower limit value of conditional expression (6) is more preferably 0.95.

Furthermore, where the light path bending element P is a prism and the distance on the optical axis from the surface closest to the object in the first lens group G1 to the prism is L1 and the distance on the optical axis of the prism is Lp, the condition represented by the following conditional expression (7) is preferably satisfied:

$$L1/Lp<1.0 \quad (7)$$

The conditional expression (7) is a conditional expression that prescribes a suitable range for the distance along the optical axis from the surface closest to the object of the first lens group G1 to the light path bending element P (prism) and the distance along the optical axis of the light path bending element P. In cases where there is a condition to raise the upper limit value of conditional expression (7), the total length of the lens closer to the object than the light path bending element P is long and the thickness of the optical system increases. As a result, the thickness of the camera main body is effected and the zoom lens is not miniaturized or made thinner.

In order to afford the results of this application greater reliability, the upper limit value of conditional expression (7) is more preferably 0.95. In addition, in order to render the results of this application reliable, the upper limit value of conditional expression (7) is more preferably 0.9.

In addition, where the focal length of the first lens group G1 is f1 and the focal length of the second lens group G2 which is disposed to an image side of the first lens group G1 among the plurality of lens groups is f2, the condition represented by the following conditional expression (8) is preferably satisfied.

$$1.9<f1/(-f2)<2.5 \quad (8)$$

Conditional expression (8) is a conditional expression for prescribing a suitable range for the focal length ratio of the first lens group G1 and the second lens group G2. In cases where there is a condition to raise the upper limit value of conditional expression (8), the refractive power of the first lens group G1 is then relatively weak and the outside diameter of the lens of the whole of the first lens group G1 is then large, which does not contribute toward miniaturization. Further, because the refractive power of the second lens group G2 is relatively strong, the generation of coma aberration is no longer suppressed and a high optical performance is no longer obtained. However, in cases where there is a condition to lower the lower limit value of conditional expression (8), the refractive power of the first lens group G1 is relatively strong and this helps toward miniaturization. However, there is a large change in the spherical aberration and imaging surface curvature during zooming, which is disadvantageous. In addition, because the refractive power of the second lens group G2 is relatively weak, the second lens group G2 is unable to make an efficient contribution to variable power and the amount of movement required for variable power can no longer be secured.

Further, in order to render the results of this application more reliable, the upper limit value of conditional expression (8) is more preferably 2.45. In addition, in order to afford the results of this application greater reliability, the upper limit value of conditional condition (8) is more preferably 2.4. In addition, in order to afford the results of this application greater reliability, the lower limit value of conditional expression (8) is more preferably 1.92. Moreover, in order to render the results of this application reliable, the lower limit value of conditional expression (8) is more preferably 1.95.

In addition, as mentioned earlier, where the second lens group G2 which is disposed to an image side of the first lens group G1 among the plurality of lens groups has negative refractive index, a focal length of the zoom lens in the wide-angle end state is fw and the focal length of the second lens group G2 is f2, the condition represented by the following conditional expression (9) is preferably satisfied.

$$1.2<(-f2)/fw<1.8 \qquad (9)$$

Conditional expression (9) is a conditional expression for prescribing a suitable focal length range for the second lens group G2. In cases where there is a condition to raise the upper limit value of conditional expression (9), the refractive power of the second lens group G2 is strong, the coma aberration and astigmatism that are produced in the second lens group G2 alone are too large and a change in the performance during short-range photography is large, which is disadvantageous. As a result, it is difficult to shorten the shortest photographic range. However, in cases where there is a condition to lower the lower limit value of conditional expression (9), the refractive power of the second lens group G2 is weak and the amount of movement during focal adjustment is then large, meaning that the member or the like of the drive system required during movement increases in size and there is a risk of interference with other members. Furthermore, where miniaturization is attempted, spherical aberration worsens, which is disadvantageous. Consequently, a smaller footprint can no longer be achieved at the time of storage in the camera main body.

In order to render the results of this application more reliable, the upper limit value of conditional expression (9) is more preferably 1.75. In addition, in order to render the results of this application more reliable, the upper limit value of conditional expression (9) is more preferably 1.72. Furthermore, in order to afford the results of this application greater reliability, the lower limit value of conditional expression (9) is more preferably 1.22. In addition, in order to render the results of this application reliable, the lower limit value of conditional expression (9) is more preferably 1.23.

In addition, where the light path bending element P is a prism and the refractive power with respect to d-line of the prism is ndp, the condition represented by the following conditional expression (10) is preferably satisfied.

$$ndp>1.80 \qquad (10)$$

Conditional expression (10) is a conditional expression which prescribes a suitable refractive power range for the prism (right-angled prism, for example) which is the light path bending element P. The right-angled prism is able to deflect the light path with total reflection, is able to reduce the loss of the light amount and the optical system can be afforded a compact constitution. In cases where there is a condition to lower the lower limit value of conditional expression (10), the shape of the prism is large and the zoom lens is large overall, which is disadvantageous. In addition, the coma aberration and lateral chromatic aberration which are produced in the first lens group G1 worsen. As a result, the thickness of the camera main body is also affected and miniaturization can no longer be achieved. A mirror or optical fiber or the like can also be employed instead of a prism for the light path bending element P.

In order to render the results of this application reliable, the lower limit value of conditional expression (10) is more preferably 1.81. In addition, in order to render the results of this application reliable, the lower limit value of conditional expression (10) is more preferably 1.82.

Furthermore, as mentioned earlier, the plurality of lens groups which constitute the zoom lens ZL preferably comprises, in order from the object, the first lens group G1, the second lens group G2, the third lens group G3, and the fourth lens group G4. Thus, the zoom lens ZL can be suitably miniaturized.

Thereupon, the second lens group G2 preferably has negative refractive power, the third lens group G3 preferably has positive refractive power, and the fourth lens group G4 preferably has positive refractive power. Thus, the desired optical performance can be obtained with a minimal constitution.

Here, the first lens group G1 and the third lens group G3 are fixed during zooming from the wide-angle end to the telephoto end and the second lens group G2 and the fourth lens group G4 preferably move along the optical axis during zooming from the wide-angle end to the telephoto end. Thus, changes in the aberrations caused by zooming can be reduced.

In addition, a plurality of lens components preferably comprises a negative meniscus lens having a convex surface facing the object. Thus, the respective lens components can be suitably miniaturized.

Here, the first lens group G1 preferably comprises a positive lens which is disposed closer to the image than the light path bending element P. Thus, the desired optical performance can be obtained by means of a combination with another lens (a negative meniscus lens, for example).

In addition, the first lens group G1 preferably comprises a lens component with an aspherical surface. Thus, changes in the coma aberration and astigmatism which occur where there is a change in the focal length from the wide-angle end to the telephoto end (zooming) can be suitably corrected. In addition, a contribution can also be made toward miniaturization of the lens outside diameter of the first lens group G1.

The field of view in the wide-angle end state is preferably equal to or more than 75 degrees and more preferably equal to or more than 80 degrees. Thus, the field of view can be afforded a wide range and the photographic freedom can be improved.

According to this example, in order to achieve a balance between a higher performance and miniaturization, the second lens group G2 preferably comprises, in order from the object, a negative lens having a concave surface facing the image and a composite lens which has negative refractive power and which is made by sticking together a negative lens having a concave surface facing the object and a positive lens. Thus, coma aberration and lateral chromatic aberration which are produced in the second lens group G2 alone can be favorably corrected with a simple constitution.

In addition, the second lens group G2 preferably comprises a lens component with an aspherical surface. Thus, changes in the coma aberration which are produced where changing the focal length from the wide-angle end state to the telephoto end state (zooming) can be favorably corrected.

Furthermore, according to this example, the third lens group G3 preferably comprises a single lens which has positive refractive power and a composite lens which has negative refractive power in order to favorably correct the spherical aberration that occurs in the third lens group G3 alone and make the emission pupil position as far as possible from the imaging surface. More specifically, the third lens group G3 preferably comprises, in order from the object, a positive lens having a convex surface facing the object and a composite lens which has negative refractive power made by sticking together a positive lens having a convex surface facing the object and a negative lens having a concave surface facing the image. Thus, as a result of an off-axis light beam being converged by means of the positive lens having a convex surface facing the object and not being separated from the optical axis, miniaturization of the lens diameter can be achieved.

In addition, the third lens group G3 preferably comprises a lens component with an aspherical surface. Thus, changes in the spherical aberration and coma aberration which are produced where changing the focal length from the wide-angle end state to the telephoto end state (zooming) can be favorably corrected.

Furthermore, according to this example, the fourth lens group G4 preferably comprises a single lens which has positive refractive power and a composite lens which has negative refractive power in order to favorably correct the spherical aberration that occurs in the fourth lens group G4 alone and make the emission pupil position as far as possible from the imaging surface. More specifically, the fourth lens group G4 preferably comprises, in order from the object, a positive lens having a convex surface facing the object and a composite lens which has negative refractive power made by sticking together a positive lens having a convex surface facing the object and a negative lens having a concave surface facing the image. Thus, as a result of an off-axis light beam being converged by means of the positive lens having a convex surface facing the object and not being separated from the optical axis, miniaturization of the lens diameter can be achieved. Furthermore, because the fourth lens group G4 overall has a positive refractive power, the emission pupil position can be distanced from the imaging surface and is suited to an optical system that employs a solid-state image pickup apparatus as a light-receiving element.

In addition, the fourth lens group G4 preferably comprises a lens component with an aspherical surface. Thus, changes in the imaging curvature which occur where changing the focal length from the wide-angle end state to the telephoto end state (zooming) can be favorably corrected.

Furthermore, according to this example, in order to prevent failure of photography as a result of image shake caused by hand shake or the like which tend to occur with high variable power zoom lenses, a shake detection system which detects shake of the lens system and driving means may be combined with the lens system and all or a portion of any one lens group among the lens groups which constitute the lens system may be decentered as a shift lens group. By shifting the image by driving the shift lens group by means of the driving means to correct image shake (a change in the imaging surface position) which arises from shake of the lens system that is detected by means of the shake detection system, image shake can be corrected. As mentioned earlier, the zoom lens ZL of this example can be made to function as a so-called vibration-proof optical system.

EXAMPLES

Each of the examples of this application will be described herein below on the basis of the attached drawings. As mentioned earlier, the zoom lens ZL according to each example comprises, in order from the object, first lens group G1, which has positive refractive power, second lens group G2, which has negative refractive power, third lens group G3, which has positive refractive power, and fourth lens group G4, which has positive refractive power. Further, the filter group FL constituted by a lowpass filter and infrared cut filter or the like is disposed between the fourth lens group G4 and imaging surface I.

Figure 3:
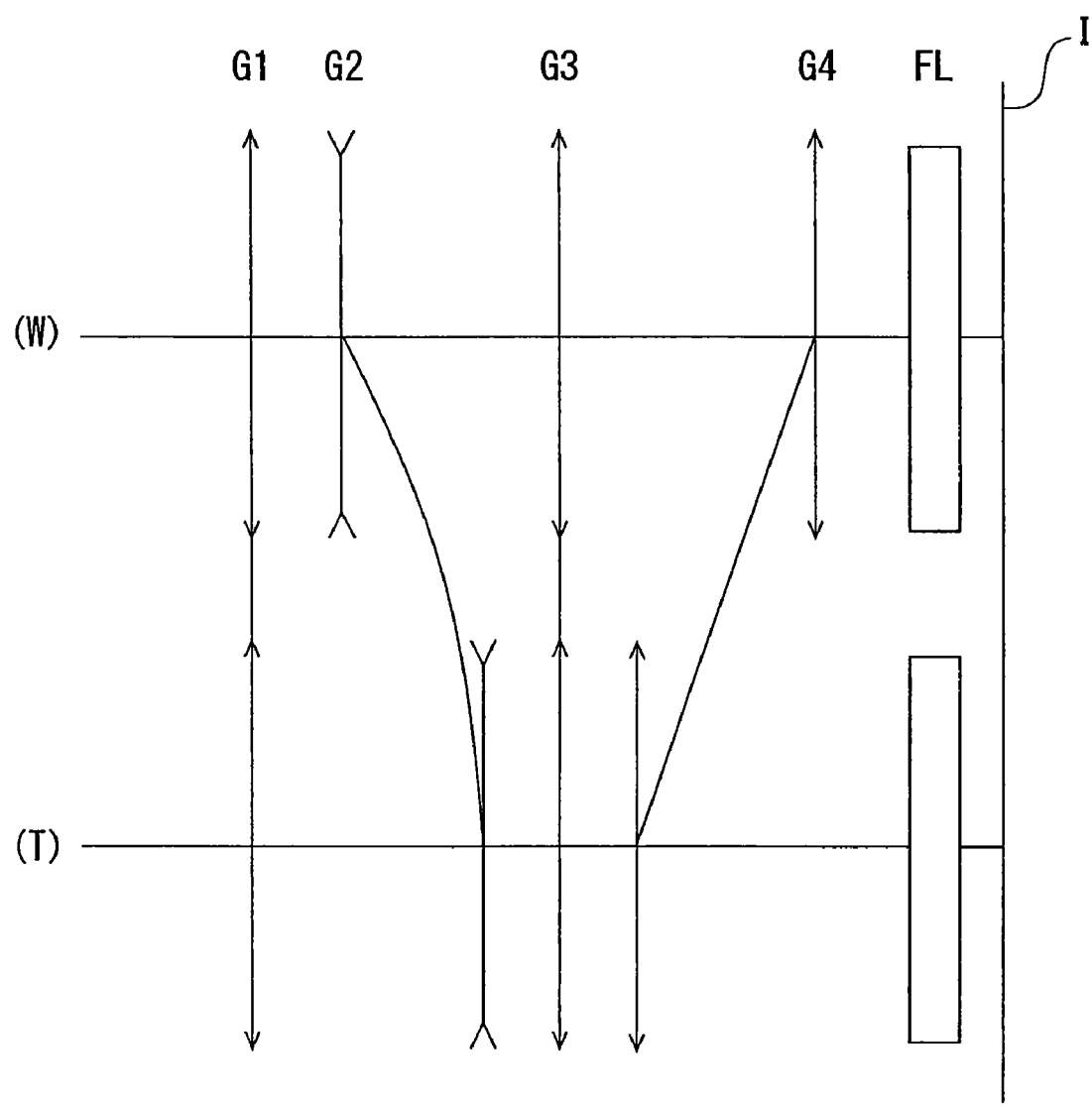
FIG. 3 is an explanatory graph showing the disposition of the refractive power of the zoom lens.

In addition, as shown in FIG. 3, during zooming from the wide-angle end to the telephoto end, the second lens group G2 and the fourth lens group G4 move along the optical axis and the first lens group G1 and the third lens group G3 are fixed to the imaging surface I. Here, the distance between the first lens group G1 and the second lens group G2 increases, the distance between the second lens group G2 and the third lens group G3 decreases and the distance between the third lens group G3 and the fourth lens group G4 decreases. Further, FIG. 3 shows the movement of each lens group for the change in the focal length state from the wide-angle end state (W) to the telephoto end state (T) (zooming) and the distribution of the refractive power of the zoom lens according to the respective examples of this application.

Tables 1 to 5 are shown hereinbelow, these tables being tables which hold the values of the parameters of the first to fifth examples respectively. In each table, f represents a focal length; F. NO represents an f-number; 2ω represents an field of view; and Bf represents a back focus. In addition, the surface number represents the order of the lens surfaces from the object in the direction of travel of the light rays and the refractive index and the Abbe number each indicate a value with respect to d-line (wavelength λ=587.6 nm). Here, 'mm' is generally used for the focal length f, the radius of curvature, the distance to the next lens surface and for the units of the other lengths which appear for all the parameter values hereinbelow. However, because the same optical performance is obtained even where the optical system is relatively enlarged or relatively reduced, the measurement units are not restricted to these units. The radius of curvature '0.0000' denotes a surface and '1.00000' which is the refractive index of air, is omitted.

Furthermore, an aspherical surface, which has been assigned the symbol * in each of the tables, is represented by the conditional expression (11) below where the height in a direction perpendicular to the optical axis is y, a distance (amount of sag) along the optical axis from the target surface at the vertex of the aspherical surface of height y to the respective aspherical surfaces is S(y), a radius of curvature of a reference spherical surface (paraxial radius of curvature) is r, a conical coefficient is K, and an aspherical coefficient of nth-order (n=4, 6, 8, 10) is Cn. In each example, the second-order aspherical surface coefficient C2 is 0, which is omitted.

$$S(y) = (y^2/r)/\{1 + (1 - K \times y^2/r^2)^{1/2}\} + C4 \times y^4 + C6 \times y^6 + C8 \times y^8 + C10 \times y^{10} \tag{11}$$

Furthermore, in each table, the on-axis air space between the first lens group G1 and the second lens group G2 is d8; the on-axis air space between the second lens group G2 and the third lens group G3 is d13; the on-axis air space between the third lens group G3 and the fourth lens group G4 is d19; and the on-axis air space between the fourth lens group G4 and the filter group FL is d24. These on-axis air spaces (d8, d13, d19, d24) change during zooming.

First Example

Figure 4:
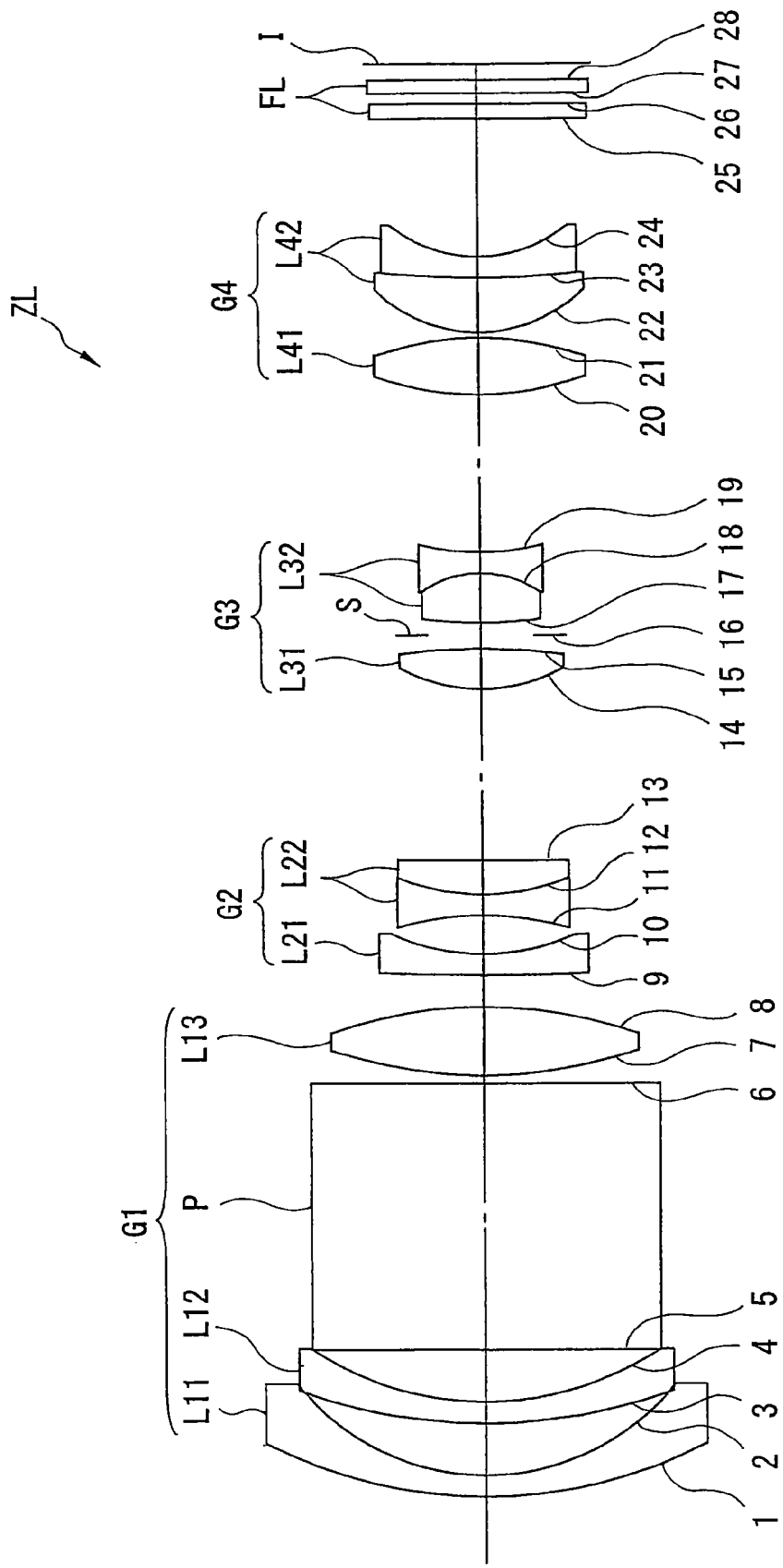
FIG. 4 is a cross-sectional view of the constitution of the zoom lens according to Example 1.

Example 1 of this application will be described by using FIGS. 4 to 7 and Table 1. FIG. 4 shows the constitution of the zoom lens according to Example 1. In the case of the zoom lens ZL of FIG. 4, the first lens group G1 comprises, in order from the object, a negative meniscus lens L11 having a convex surface facing the object, a negative meniscus lens L12 having a convex surface facing the object, a light path bending element P such as a right-angled prism whose objective is to bend the path of light through approximately 90 degrees, and a two-sided convex shape positive lens L13 which has an aspherical surface on the object. The second lens group G2 comprises, in order from the object, a negative meniscus lens L21 which has an aspherical surface on the image and having a convex surface facing the object and a negative composite lens L22 made by sticking together a two-sided concave shape negative lens and a two-sided convex shape positive lens.

The third lens group G3 comprises, in order from the object, a two-sided convex shape positive lens L31 which has an aspherical surface on the object and a negative composite lens L32 made by sticking together a two-sided convex shape positive lens and a two-sided concave shape negative lens. The fourth lens group G4 comprises, in order from the object, a two-sided convex shape positive lens L41 which has an aspherical surface on the image and a negative composite lens L42 made by sticking together a positive meniscus lens having a convex surface facing the object and a negative meniscus lens having a concave surface facing the image. Further, the filter group FL is disposed between the fourth lens group G4 and the imaging surface I.

The imaging surface I is formed on an image pickup apparatus (not shown) and this image pickup apparatus comprises a CCD or CMOS or the like (as is also true for the examples hereinabove). In addition, an aperture stop S is disposed in the third lens group G3 and is fixed to the imaging surface I during zooming from the wide-angle end to the telephoto end. In FIG. 4, the light path bending element P is illustrated in an open state.

Table 1 below shows the respective parameters of Example 1. The surface numbers 1 to 28 in Table 1 correspond to surfaces 1 to 28 in FIG. 4. Further, according to Example 1, the respective lens surfaces of the seventh, tenth, fourteenth and twenty-first surfaces are formed with an aspherical shape.

TABLE 1

[All parameters]

| Wide-angle end | | Intermediate focal length | | Telephoto end |
|---|---|---|---|---|
| f = 4.76 | to | 10.90 | to | 13.60 |
| F.No = 3.39 | to | 4.50 | to | 5.10 |
| 2ω = 80.10 | to | 37.24 | to | 30.08 |

[Lens parameters]

| Surface number | Radius of curvature | Surface distance | Refractive index | Abbe number |
|---|---|---|---|---|
| 1 | 18.5837 | 0.80 | 1.94594 | 17.98 |
| 2 | 9.2523 | 1.95 | | |
| 3 | 21.1675 | 0.80 | 1.94594 | 17.98 |
| 4 | 12.1051 | 1.95 | | |
| 5 | 0.0000 | 10.00 | 1.88300 | 40.76 |
| 6 | 0.0000 | 0.30 | | |
| 7* | 16.6856 | 2.59 | 1.77377 | 47.17 |
| 8 | −17.4860 | (d8) | | |
| 9 | 120.1506 | 0.80 | 1.85135 | 40.10 |
| 10* | 8.6224 | 1.45 | | |
| 11 | −11.4881 | 0.80 | 1.81600 | 46.62 |
| 12 | 8.5611 | 1.31 | 1.94594 | 17.98 |
| 13 | −462.6937 | (d13) | | |
| 14* | 6.2540 | 1.52 | 1.58913 | 61.25 |
| 15 | −23.4186 | 0.50 | | |
| 16 | 0.0000 | 0.50 | | (aperture stop S) |
| 17 | 16.9167 | 1.87 | 1.65160 | 58.55 |
| 18 | −3.8752 | 0.80 | 1.83481 | 42.71 |
| 19 | 9.4841 | (d19) | | |
| 20 | 11.5818 | 2.15 | 1.60602 | 57.44 |
| 21* | −10.2025 | 0.20 | | |
| 22 | 5.6247 | 2.05 | 1.49700 | 81.54 |
| 23 | 36.4651 | 0.80 | 1.92286 | 20.88 |
| 24 | 5.3918 | (d24) | | |
| 25 | 0.0000 | 0.55 | 1.54437 | 70.51 |
| 26 | 0.0000 | 0.40 | | |
| 27 | 0.0000 | 0.50 | 1.51633 | 64.14 |
| 28 | 0.0000 | (Bf) | | |

[Aspherical surface data]

| Surface number | K | C4 | C6 | C8 | C10 |
|---|---|---|---|---|---|
| 7 | −4.2112 | +6.3347 × $10^{-5}$ | −1.3742 × $10^{-6}$ | +2.0994 × $10^{-8}$ | −2.1938 × $10^{-10}$ |
| 10 | −9.0000 | +1.8903 × $10^{-3}$ | −7.0975 × $10^{-5}$ | +2.6340 × $10^{-6}$ | +3.3830 × $10^{-8}$ |
| 14 | +0.2972 | +1.1297 × $10^{-4}$ | +1.9446 × $10^{-5}$ | +6.7916 × $10^{-7}$ | −1.0642 × $10^{-8}$ |
| 21 | +2.5363 | +6.8503 × $10^{-4}$ | −7.8123 × $10^{-7}$ | +1.0665 × $10^{-6}$ | −4.1646 × $10^{-8}$ |

TABLE 1-continued

[Variable distance]

|  | Wide-angle end | Intermediate focal length | Telephoto end |
| --- | --- | --- | --- |
| f | 4.7600 | 10.8950 | 13.6000 |
| d8 | 1.2108 | 5.8514 | 6.6474 |
| d13 | 6.4865 | 1.8460 | 1.0500 |
| d19 | 5.9585 | 2.3201 | 1.1000 |
| d24 | 5.1473 | 8.7857 | 10.0058 |
| Bf | 0.5999 | 0.5997 | 0.5996 |

[Condition mapping values]

nd1 = 1.94594
nd2 = 1.94594
vd1 = 17.98
vd2 = 17.98
L1 = 5.500
Lp = 10.000
fw = 4.76000
f1 = 14.08549
f2 = −6.63946
ndp = 1.88300
Conditional expression (1) nd1 = 1.94594
Conditional expression (2) nd2 = 1.94594
Conditional expression (3) nd1/nd2 = 1.000
Conditional expression (4) vd1 = 17.98
Conditional expression (5) vd2 = 17.98
Conditional expression (6) vd1/vd2 = 1.000
Conditional expression (7) L1/Lp = 0.550
Conditional expression (8) f1/(−f2) = 2.122
Conditional expression (9) (−f2)/fw = 1.395
Conditional expression (10) ndp = 1.88300

Thus, it is clear that the above conditional expressions (1) to (10) are all satisfied by this example. It is also clear that L1=5.500 for Lp=10.000 and L1 can be small in comparison with the prior art.

Figure 5:
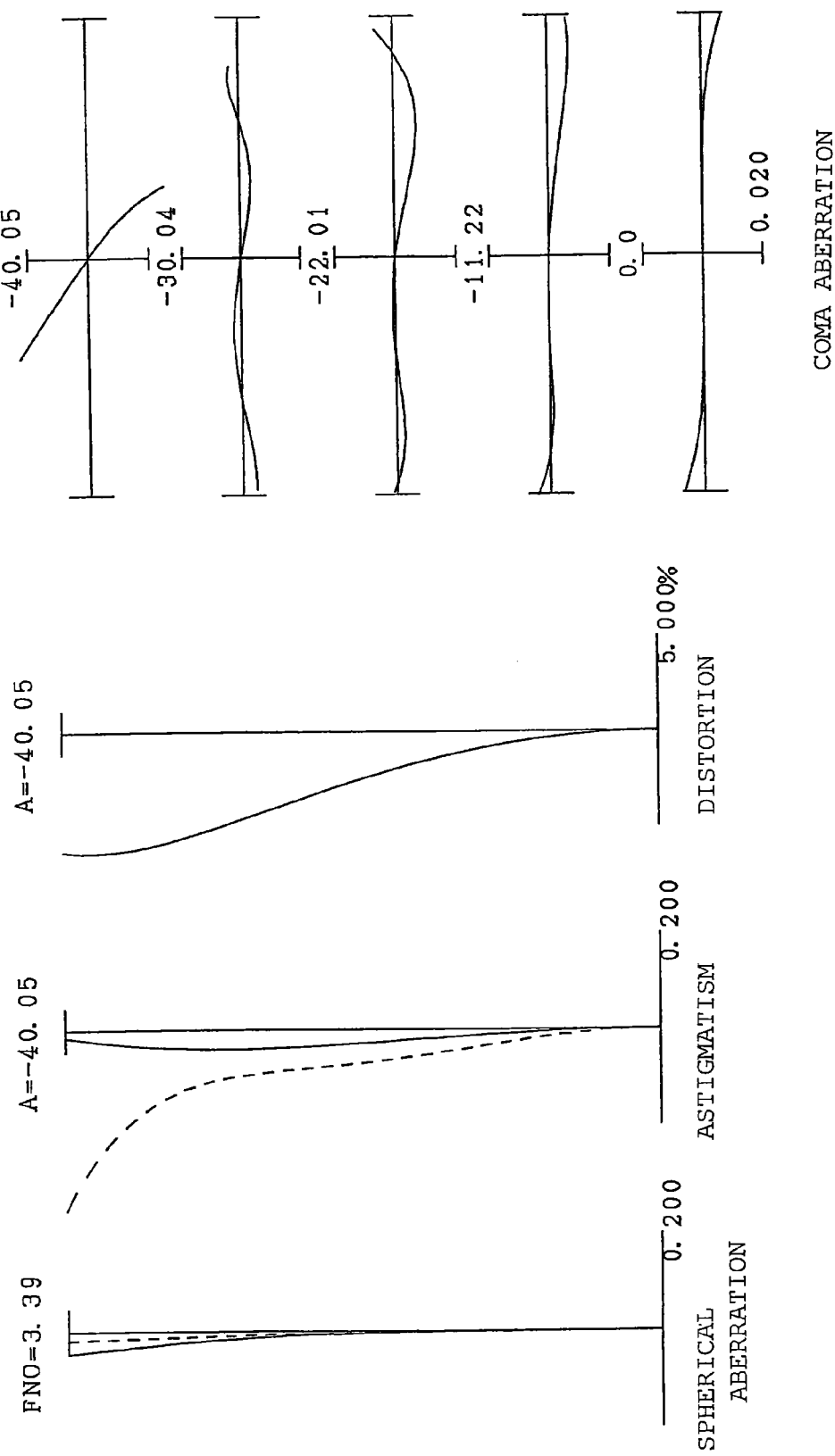
FIG. 5 is a graph showing various aberrations of the zoom lens according to Example 1 upon focusing on infinity in the wide-angle end state.
Figure 6:
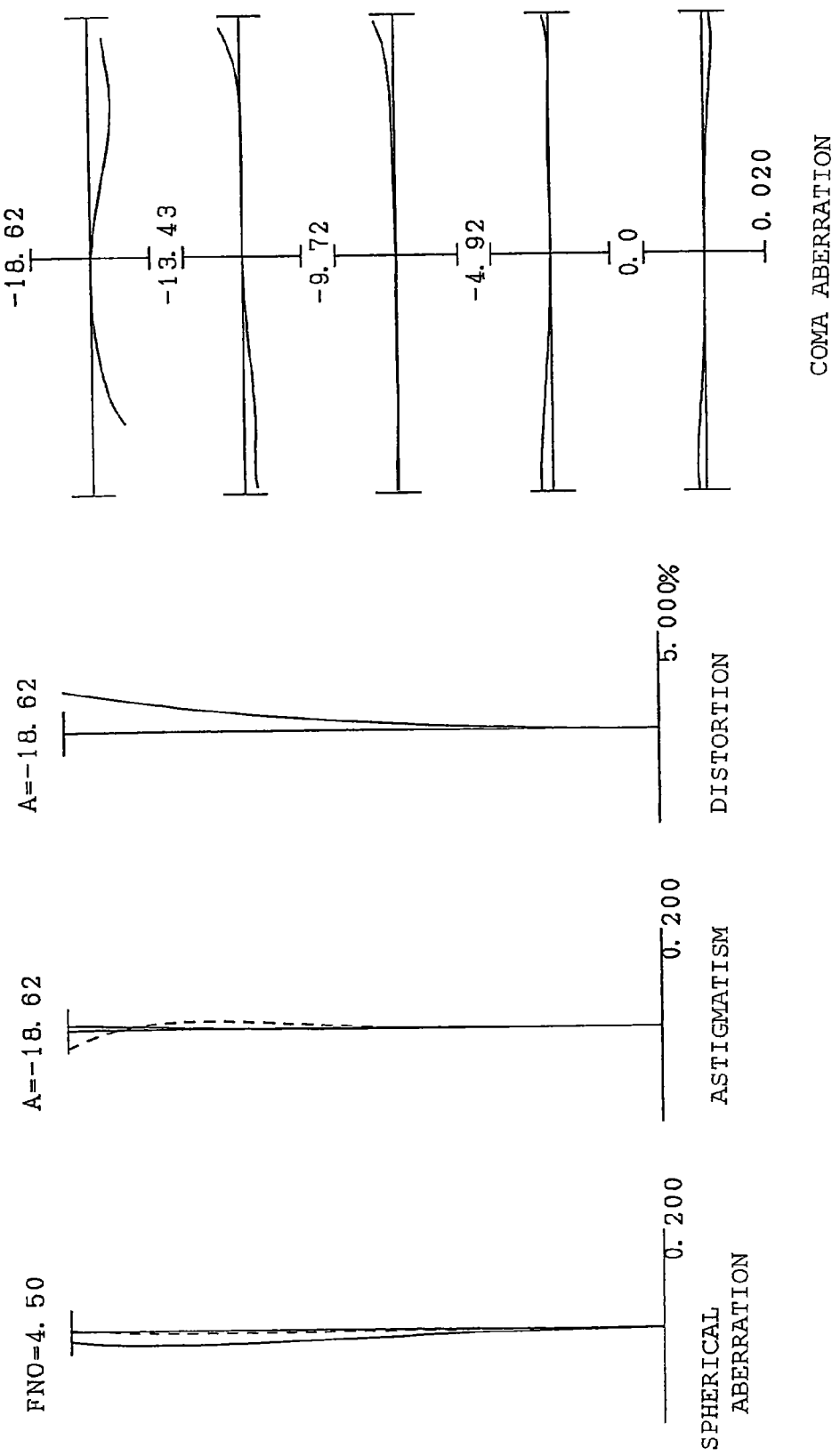
FIG. 6 is a graph showing various aberrations of the zoom lens according to Example 1 upon focusing on infinity in the intermediate focal length state.
Figure 7:
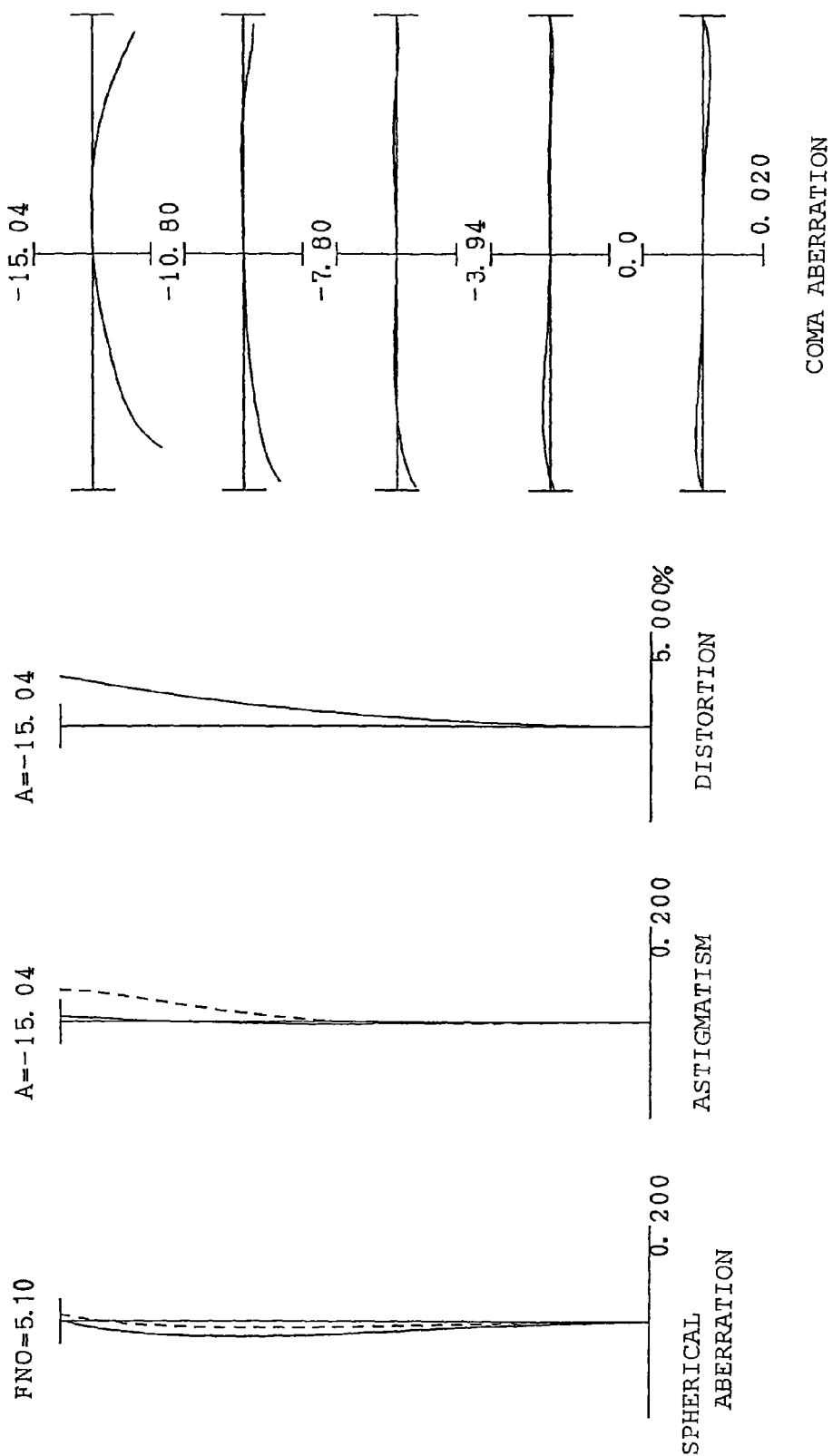
FIG. 7 is a graph showing various aberrations of the zoom lens according to Example 1 upon focusing on infinity in the telephoto end state.

FIGS. 5 to 7 are graphs showing various aberrations for Example 1 with respect to d-line (wavelength λ=587.6 nm). That is, FIG. 5 is a graph showing various aberrations of the zoom lens according to Example 1 upon focusing on infinity in the wide-angle end state (f=4.76 mm); FIG. 6 is a graph showing various aberrations of the zoom lens according to Example 1 upon focusing on infinity in the intermediate focal length state (f=10.90 mm); and FIG. 7 is a graph showing various aberrations of the zoom lens according to Example 1 upon focusing on infinity in the telephoto end state (f=13.60 mm).

In the respective aberration graphs, the FNO represents an f-number and A represents a half angle of view for each image height. Further, in the aberration graph representing astigmatism, the solid line indicates the sagittal imaging surface and the broken line indicates the meridional imaging surface. In addition, in the aberration graph representing spherical aberration, the solid line indicates spherical aberration and the broken line indicates the sine condition. The description of the aberration graphs hereinabove is the same for the other examples. Furthermore, as is evident from the respective aberration graphs, it is clear that, according to Example 1, the various aberrations are favorably corrected in the respective focal length states from the wide-angle end state to the telephoto end state and Example 1 possesses superior image formation performance.

Second Example

Figure 8:
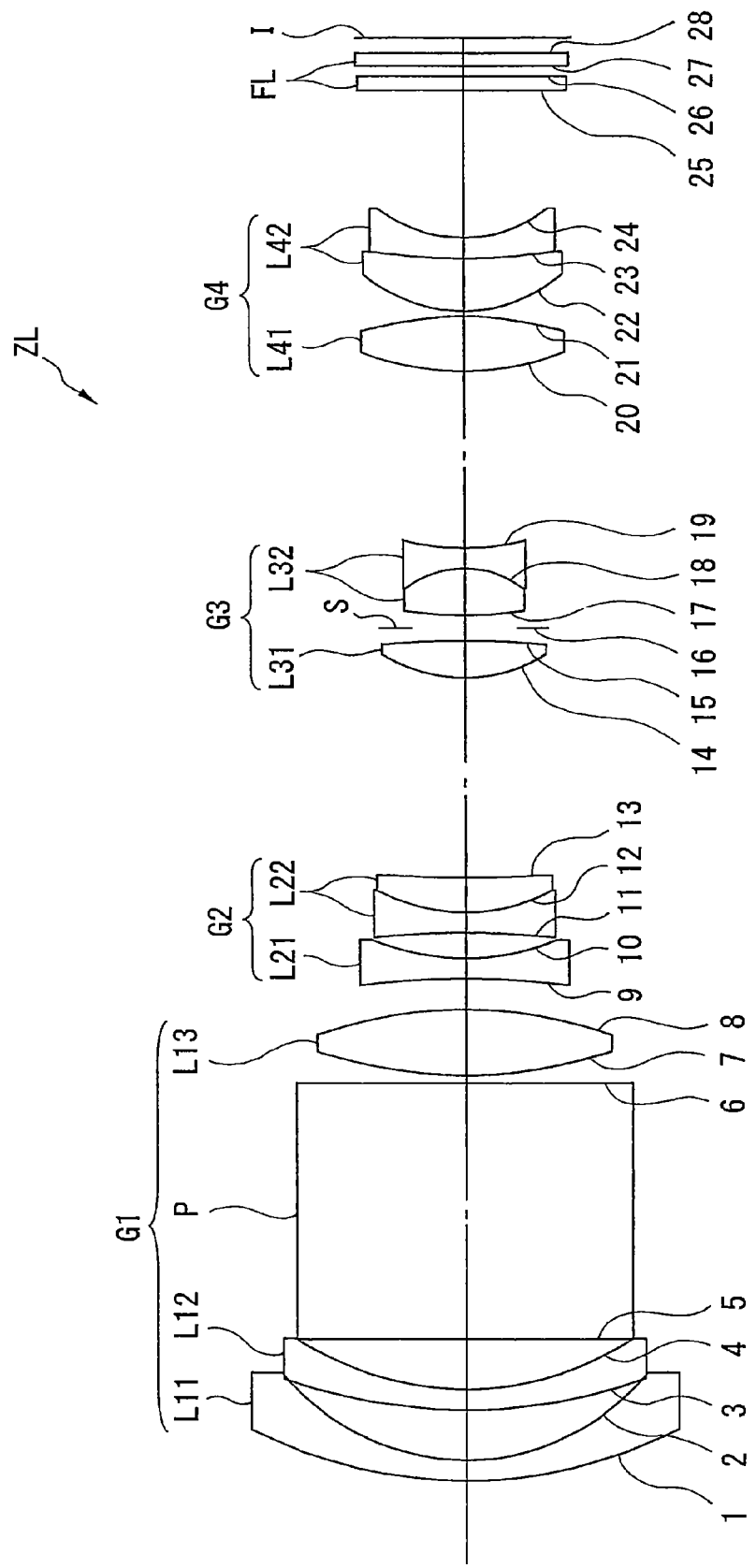
FIG. 8 is a cross-sectional view of the constitution of the zoom lens according to Example 2.

Example 2 of this application will be described hereinbelow with reference to FIGS. 8 to 11 and Table 2. FIG. 8 shows the constitution of the zoom lens according to Example 2. The zoom lens of Example 2 has the same constitution as that of the zoom lens of Example 1 except for the constitution of the second lens group and a detailed description is omitted by assigning the same reference numerals to the respective parts as in the case of Example 1. The second lens group G2 of Example 2 comprises, in order from the object, a two-sided concave shape negative lens L21 which has an aspherical surface on the image and a negative composite lens L22 made by sticking together a two-sided concave shape negative lens and a positive meniscus lens having a convex surface facing the object.

Table 2 below shows the respective parameters of Example 2. The surface numbers 1 to 28 of Table 2 correspond to the surfaces 1 to 28 in FIG. 8. Further, according to Example 2, the respective lens surfaces of the seventh, tenth, fourteenth and twenty-first surfaces are formed with an aspherical shape.

TABLE 2

[All parameters]

| Wide-angle end | | Intermediate focal length | | Telephoto end |
| --- | --- | --- | --- | --- |
| f = 4.76 | to | 10.90 | to | 16.83 |
| F.No = 3.43 | to | 4.38 | to | 5.32 |
| 2ω = 80.12 | to | 37.24 | to | 24.50 |

TABLE 2-continued

[Lens parameters]

| Surface number | Radius of curvature | Surface distance | Refractive index | Abbe number |
|---|---|---|---|---|
| 1 | 18.7424 | 0.80 | 1.94594 | 17.98 |
| 2 | 9.3864 | 1.95 | | |
| 3 | 21.6083 | 0.80 | 1.94594 | 17.98 |
| 4 | 12.2621 | 1.95 | | |
| 5 | 0.0000 | 10.00 | 1.88300 | 40.76 |
| 6 | 0.0000 | 0.30 | | |
| 7* | 16.8349 | 2.60 | 1.77377 | 47.17 |
| 8 | −17.3291 | (d8) | | |
| 9 | −30.3831 | 0.80 | 1.85135 | 40.10 |
| 10* | 9.5012 | 1.00 | | |
| 11 | −33.3537 | 0.80 | 1.81600 | 46.62 |
| 12 | 7.2272 | 1.38 | 1.94594 | 17.98 |
| 13 | 51.7364 | (d13) | | |
| 14* | 6.1623 | 1.46 | 1.58913 | 61.25 |
| 15 | −32.7052 | 0.50 | | |
| 16 | 0.0000 | 0.50 | | (aperture stop S) |
| 17 | 16.2574 | 1.85 | 1.65160 | 58.55 |
| 18 | −3.7749 | 0.80 | 1.83481 | 42.71 |
| 19 | 9.8126 | (d19) | | |
| 20 | 11.0508 | 2.15 | 1.60602 | 57.44 |
| 21* | −11.7394 | 0.20 | | |
| 22 | 6.0262 | 2.05 | 1.49700 | 81.54 |
| 23 | 24.0461 | 0.80 | 1.92286 | 20.88 |
| 24 | 5.4797 | (d24) | | |
| 25 | 0.0000 | 0.55 | 1.54437 | 70.51 |
| 26 | 0.0000 | 0.40 | | |
| 27 | 0.0000 | 0.50 | 1.51633 | 64.14 |
| 28 | 0.0000 | (Bf) | | |

[Aspherical surface data]

| Surface number | K | C4 | C6 | C8 | C10 |
|---|---|---|---|---|---|
| 7 | −3.8785 | $+4.8309 \times 10^{-5}$ | $-8.3247 \times 10^{-7}$ | $+1.7150 \times 10^{-9}$ | $+4.4539 \times 10^{-11}$ |
| 10 | −9.0000 | $+1.3364 \times 10^{-3}$ | $-5.0474 \times 10^{-5}$ | $+1.5973 \times 10^{-6}$ | $+1.2041 \times 10^{-8}$ |
| 14 | +0.4450 | $+1.9519 \times 10^{-4}$ | $+1.4324 \times 10^{-5}$ | $+1.3179 \times 10^{-6}$ | $-6.5285 \times 10^{-9}$ |
| 21 | +0.2452 | $+3.9638 \times 10^{-4}$ | $+1.2430 \times 10^{-7}$ | $+4.3306 \times 10^{-7}$ | $-2.1186 \times 10^{-8}$ |

[Variable distance]

| | Wide-angle end | Intermediate focal length | Telephoto end |
|---|---|---|---|
| f | 4.7600 | 10.8950 | 16.8301 |
| d8 | 1.2174 | 6.2820 | 8.0585 |
| d13 | 7.8909 | 2.8265 | 1.0500 |
| d19 | 6.9417 | 3.3531 | 1.1000 |
| d24 | 5.7090 | 9.2974 | 11.5506 |
| Bf | 0.5999 | 0.6000 | 0.6001 |

[Condition mapping values]

nd1 = 1.94594
nd2 = 1.94594
vd1 = 17.98
vd2 = 17.98
L1 = 5.500
Lp = 10.000
fw = 4.76001
f1 = 14.04786
f2 = −6.74050
ndp = 1.88300
Conditional expression (1) nd1 = 1.94594
Conditional expression (2) nd2 = 1.94594
Conditional expression (3) nd1/nd2 = 1.000
Conditional expression (4) vd1 = 17.98
Conditional expression (5) vd2 = 17.98
Conditional expression (6) vd1/vd2 = 1.000
Conditional expression (7) L1/Lp = 0.550
Conditional expression (8) f1/(−f2) = 2.084
Conditional expression (9) (−f2)/fw = 1.416
Conditional expression (10) ndp = 1.88300

Thus, it is clear that the above conditional expressions (1) to (10) are all satisfied by this example. It is also clear that L1=5.500 for Lp=10.000 and L1 can be small in comparison with the prior art.

Figure 9:
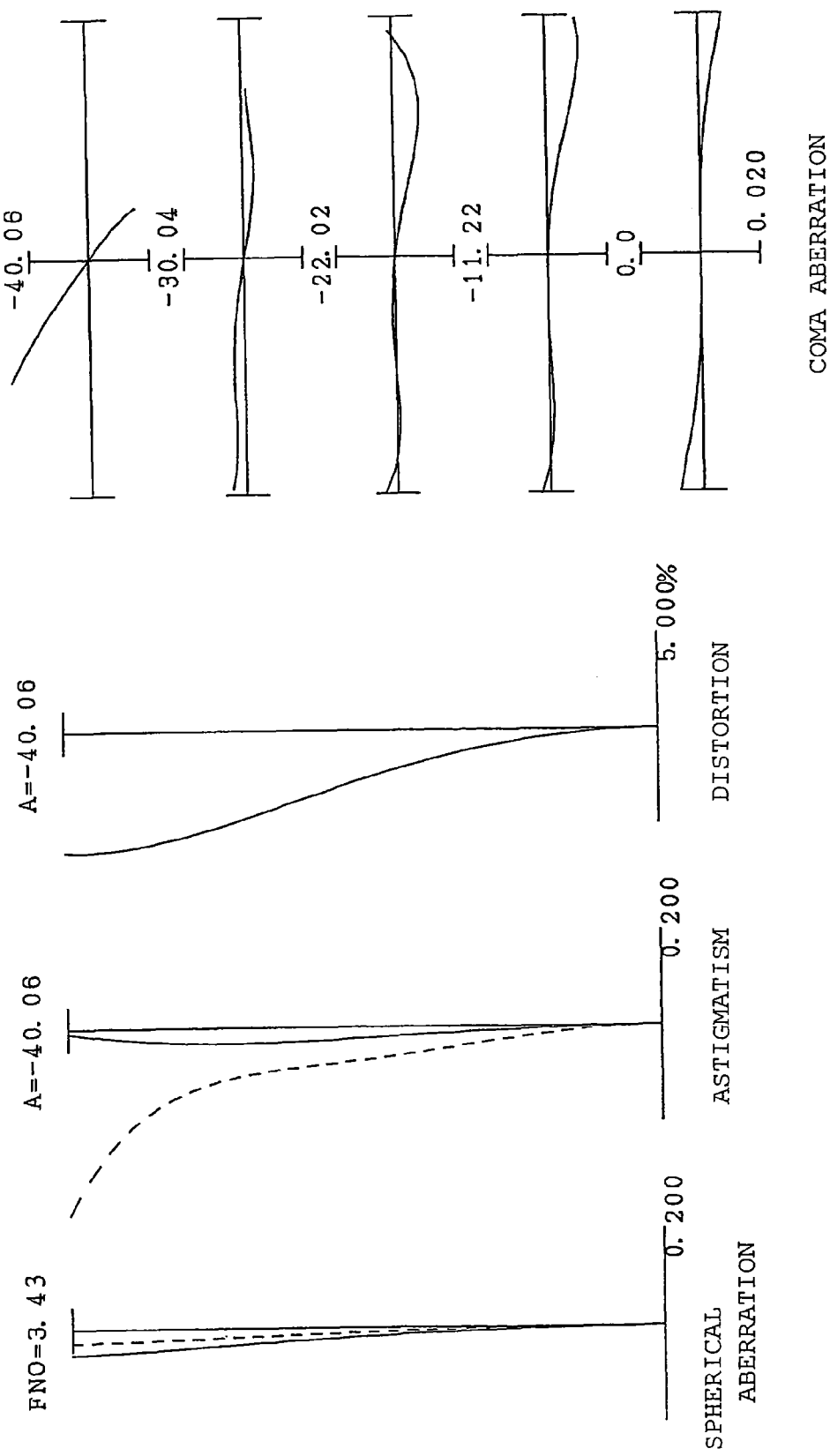
FIG. 9 is a graph showing various aberrations of the zoom lens according to Example 2 upon focusing on infinity in the wide-angle end state.
Figure 10:
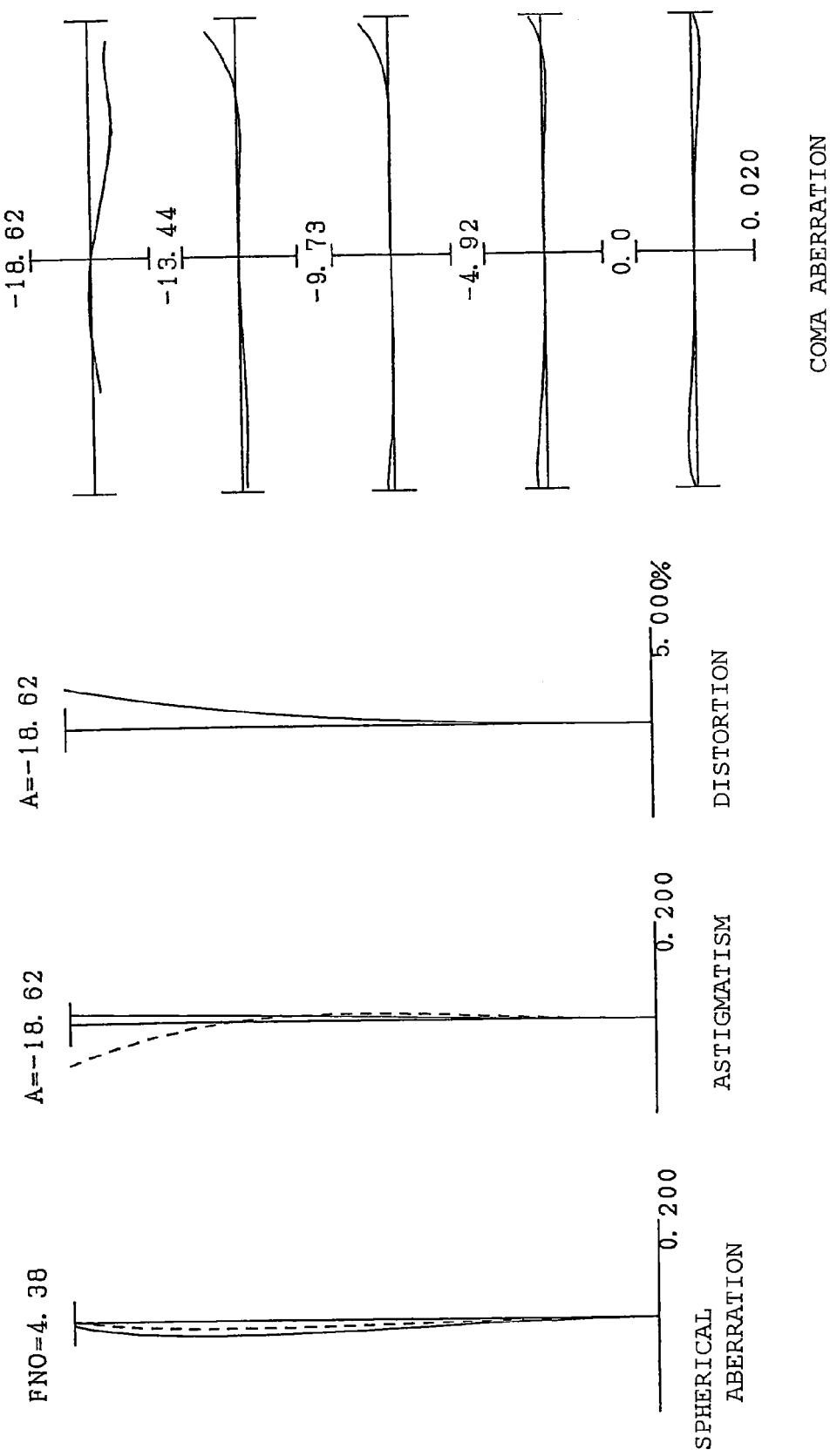
FIG. 10 is a graph showing various aberrations of the zoom lens according to Example 2 upon focusing on infinity in the intermediate focal length state.
Figure 11:
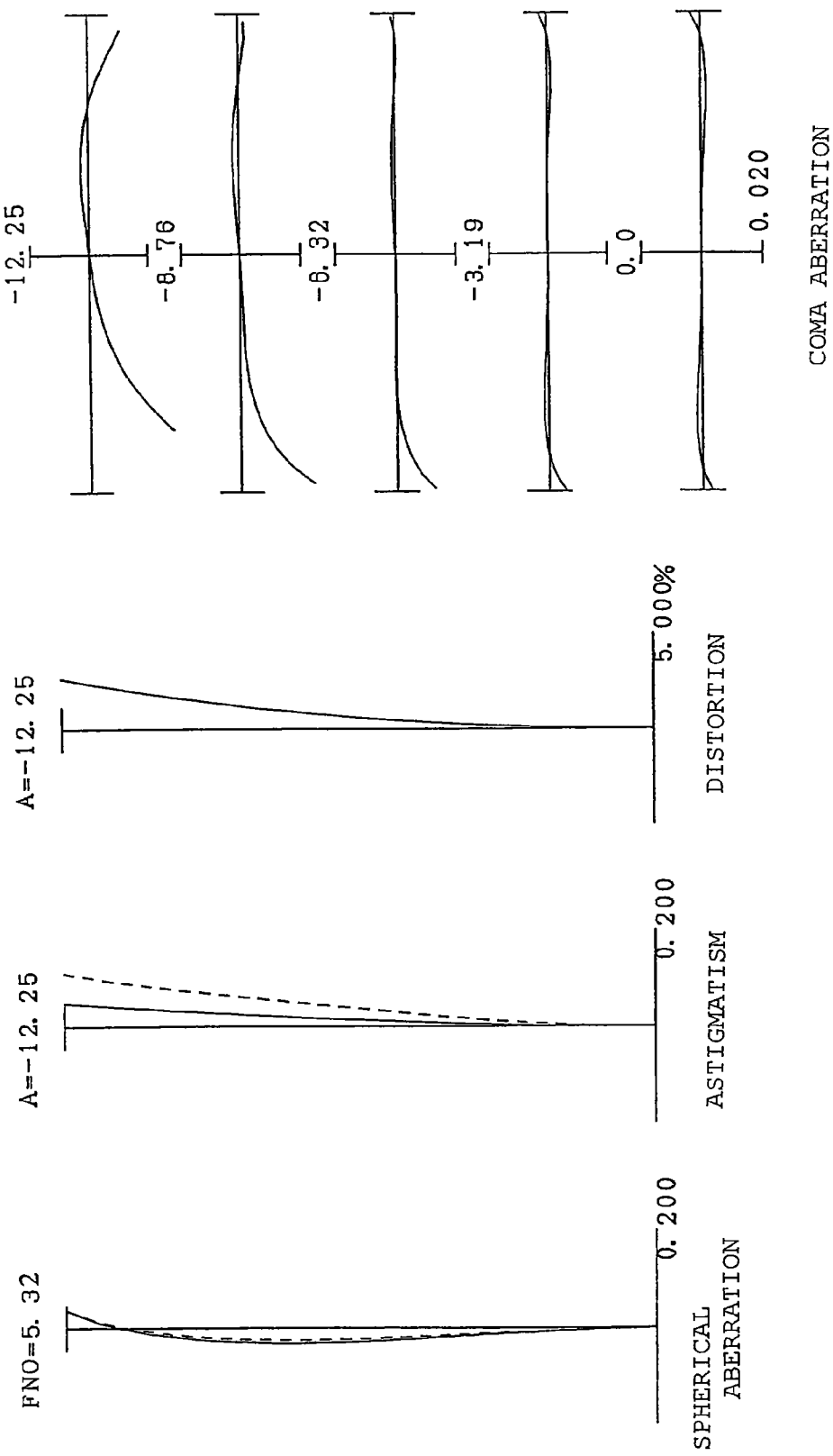
FIG. 11 is a graph showing various aberrations of the zoom lens according to Example 2 upon focusing on infinity in the telephoto end state.

FIGS. 9 to 11 are graphs showing various aberrations for Example 2 with respect to d-line (wavelength λ=587.6 nm). That is, FIG. 9 is a graph showing various aberrations of the zoom lens according to Example 2 upon focusing on infinity in the wide-angle end state (f=4.76 mm); FIG. 10 is a graph showing various aberrations of the zoom lens according to Example 2 upon focusing on infinity in the intermediate focal length state (f=10.90 mm); and FIG. 11 is a graph showing various aberrations of the zoom lens according to Example 2 upon focusing on infinity in the telephoto end state (f=16.83 mm). Furthermore, as is evident from the respective aberration graphs, it is clear that, according to Example 2, the various aberrations are favorably corrected in the respective focal length states from the wide-angle end state to the telephoto end state and Example 2 possesses superior image formation performance.

Third Example

Figure 12:
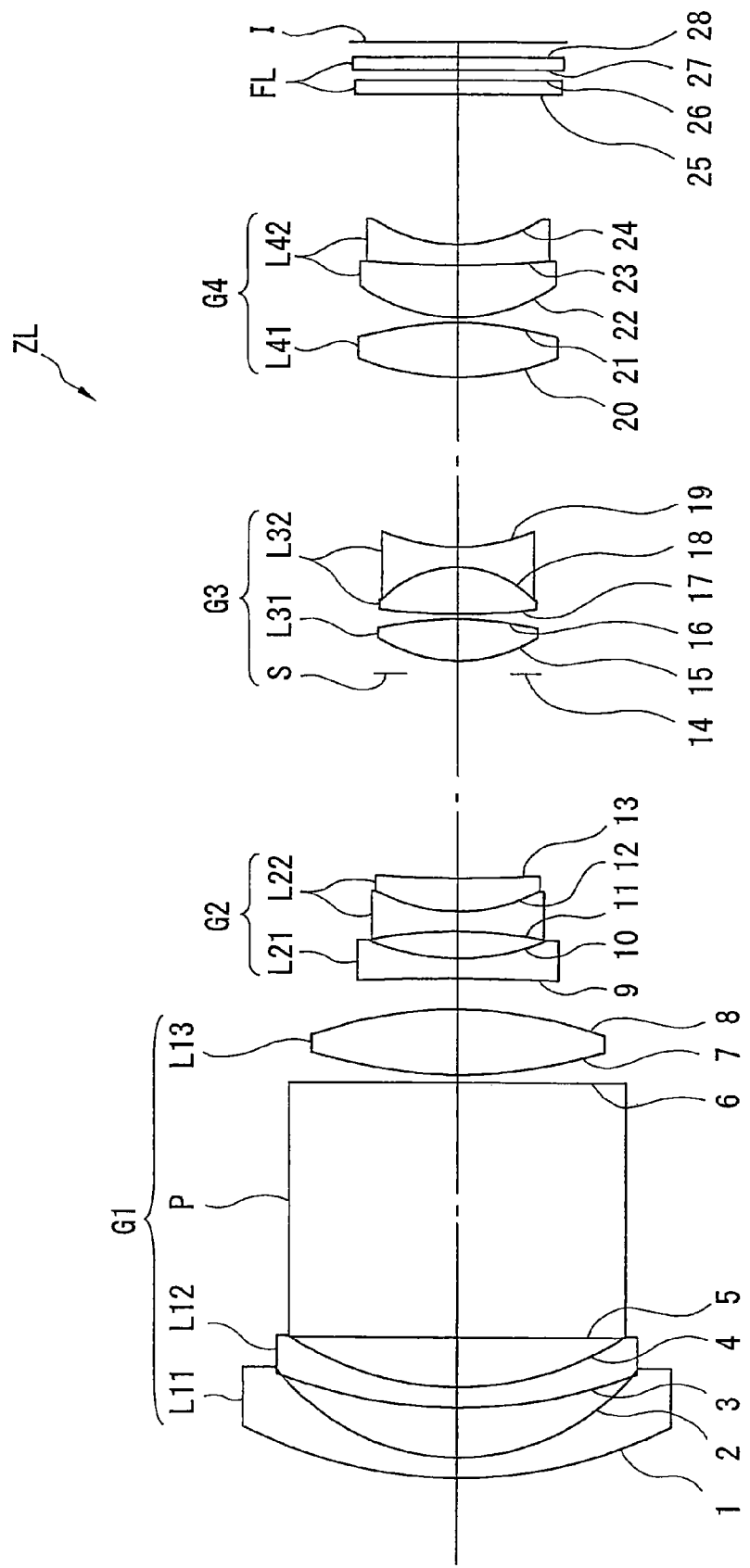
FIG. 12 is a cross-sectional view of the constitution of the zoom lens according to Example 3.

Example 3 of the present invention will be described hereinbelow with reference to FIGS. 12 to 15 and Table 3. FIG. 12 shows the constitution of the zoom lens according to Example 3. The zoom lens of Example 3 has the same constitution as that of the zoom lens of Example 1 except for the constitution of the second lens group and aperture stop and a detailed description is omitted by assigning the same reference numerals to the respective parts as in the case of Example 1. The second lens group G2 of Example 3 comprises, in order from the object, a two-sided concave shape negative lens L21 which has an aspherical surface on the image and a negative composite lens L22 made by sticking together a two-sided concave shape negative lens and a positive meniscus lens having a convex surface facing the object. The aperture stop S of Example 3 is disposed closest to the object of the third lens group G3 and is fixed to the imaging surface I during zooming from the wide-angle end to the telephoto end.

Table 3 below shows the respective parameters of Example 3. The surface numbers 1 to 28 of Table 3 correspond to the surfaces 1 to 28 in FIG. 12. Further, according to Example 3, the respective lens surfaces of the seventh, tenth, fifteenth and twenty-first surfaces are formed with an aspherical shape.

TABLE 3

| [All parameters] | | | | |
|---|---|---|---|---|
| Wide-angle end | | Intermediate focal length | | Telephoto end |
| f = 4.76 | to | 10.90 | to | 16.83 |
| F.No = 3.61 | to | 4.48 | to | 5.31 |
| 2ω = 80.08 | to | 37.30 | to | 24.50 |

| [Lens parameters] | | | | |
|---|---|---|---|---|
| Surface number | Radius of curvature | Surface distance | Refractive index | Abbe number |
| 1 | 18.6003 | 0.80 | 1.94594 | 17.98 |
| 2 | 9.1299 | 1.95 | | |
| 3 | 20.0061 | 0.80 | 1.94594 | 17.98 |
| 4 | 12.2378 | 1.95 | | |
| 5 | 0.0000 | 10.00 | 1.83400 | 37.16 |
| 6 | 0.0000 | 0.30 | | |
| 7* | 17.6318 | 2.59 | 1.77377 | 47.17 |
| 8 | −17.0143 | (d8) | | |
| 9 | −95.1601 | 0.80 | 1.85135 | 40.10 |
| 10* | 9.6243 | 1.05 | | |
| 11 | −18.7968 | 0.80 | 1.81600 | 46.62 |
| 12 | 7.0462 | 1.31 | 1.94594 | 17.98 |
| 13 | 49.4372 | (d13) | | |
| 14 | 0.0000 | 0.50 | | (aperture stop S) |
| 15* | 5.7357 | 1.66 | 1.58913 | 61.25 |
| 16 | −13.8410 | 0.20 | | |
| 17 | 27.9825 | 1.85 | 1.65160 | 58.55 |
| 18 | −4.2034 | 0.80 | 1.83481 | 42.71 |
| 19 | 7.6543 | (d19) | | |
| 20 | 11.0138 | 2.15 | 1.60602 | 57.44 |
| 21* | −11.6568 | 0.20 | | |
| 22 | 6.7719 | 2.05 | 1.49700 | 81.54 |
| 23 | 43.7568 | 0.80 | 1.92286 | 20.88 |
| 24 | 6.2063 | (d24) | | |

TABLE 3-continued

| 25 | 0.0000 | 0.55 | 1.54437 | 70.51 |
| 26 | 0.0000 | 0.40 | | |
| 27 | 0.0000 | 0.50 | 1.51633 | 64.14 |
| 28 | 0.0000 | (Bf) | | |

[Aspherical surface data]

| Surface number | K | C4 | C6 | C8 | C10 |
|---|---|---|---|---|---|
| 7 | −3.5829 | +3.1195 × 10$^{-5}$ | −6.5188 × 10$^{-7}$ | +8.6095 × 10$^{-10}$ | +4.2745 × 10$^{-11}$ |
| 10 | −9.0000 | +1.3893 × 10$^{-3}$ | −3.2887 × 10$^{-5}$ | −2.9925 × 10$^{-7}$ | +1.1579 × 10$^{-7}$ |
| 15 | +0.1967 | +5.0256 × 10$^{-5}$ | +6.1634 × 10$^{-6}$ | +2.2998 × 10$^{-6}$ | −1.2189 × 10$^{-7}$ |
| 21 | +0.6898 | +3.7981 × 10$^{-4}$ | +7.2724 × 10$^{-6}$ | −9.6564 × 10$^{-8}$ | −5.0538 × 10$^{-9}$ |

[Variable distance]

| | Wide-angle end | Intermediate focal length | Telephoto end |
|---|---|---|---|
| f | 4.7600 | 10.8950 | 16.8300 |
| d8 | 1.2203 | 6.3686 | 8.2935 |
| d13 | 8.1217 | 2.9734 | 1.0485 |
| d19 | 6.7033 | 3.1869 | 1.1000 |
| d24 | 5.8354 | 9.3517 | 11.4386 |
| Bf | 0.6000 | 0.6000 | 0.6000 |

[Condition mapping values]

nd1 = 1.94594
nd2 = 1.94594
vd1 = 17.98
vd2 = 17.98
L1 = 5.500
Lp = 10.000
fw = 4.76000
f1 = 14.09358
f2 = −6.74689
ndp = 1.83400
Conditional expression (1)nd1 = 1.94594
Conditional expression (2)nd2 = 1.94594
Conditional expression (3) nd1/nd2 = 1.000
Conditional expression (4) vd1 = 17.98
Conditional expression (5) vd2 = 17.98
Conditional expression (6) vd1/vd2 = 1.000
Conditional expression (7) L1/Lp = 0.550
Conditional expression (8) f1/(−f2) = 2.089
Conditional expression (9) (−f2)/fw = 1.417
Conditional expression (10) ndp = 1.83400

Thus, it is clear that the above conditional expressions (1) to (10) are all satisfied by this example. It is also clear that L1=5.500 for Lp=10.000 and L1 can be small in comparison with the prior art.

Figure 13:
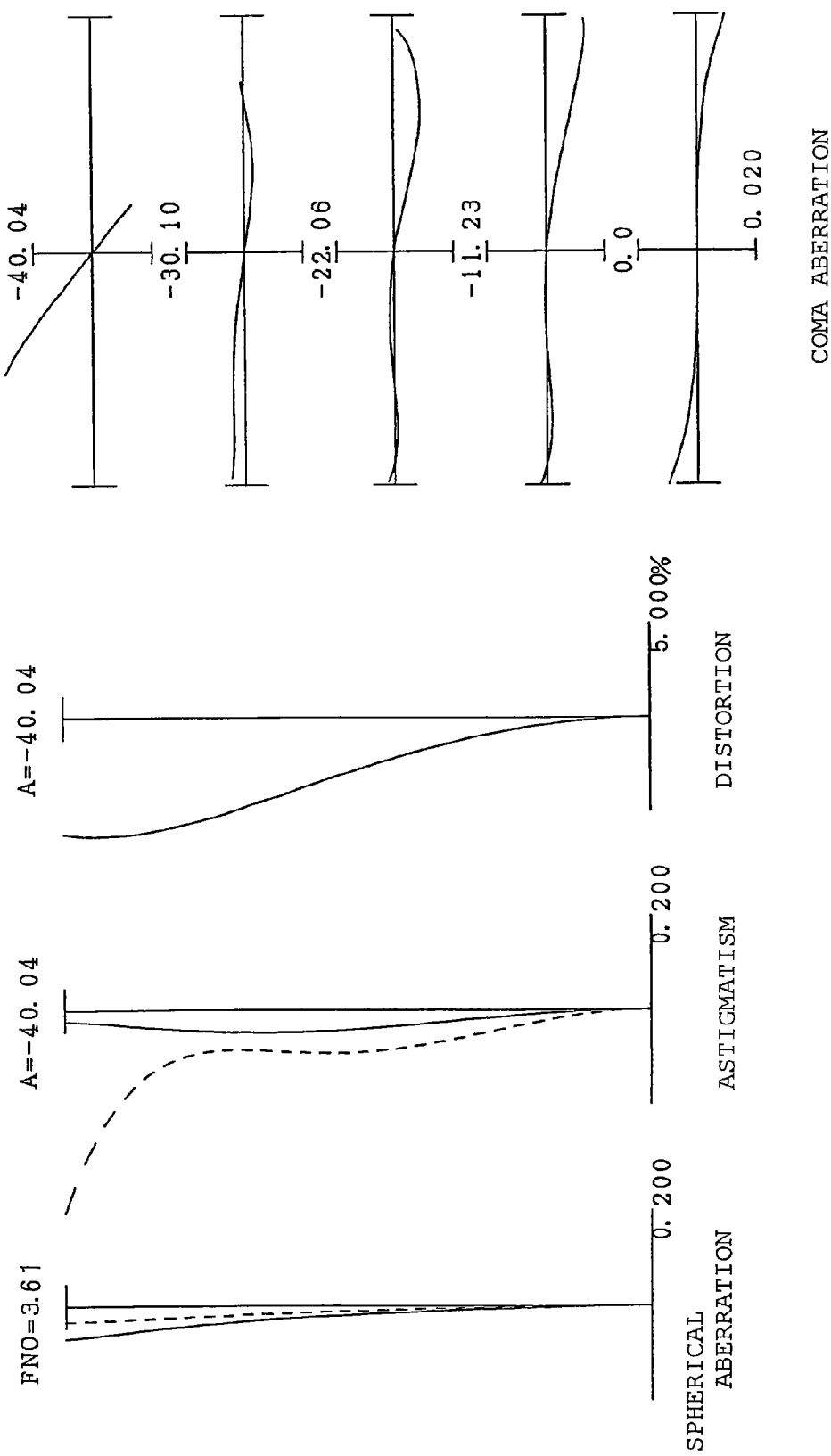
FIG. 13 is a graph showing various aberrations of the zoom lens according to Example 3 upon focusing on infinity in the wide-angle end state.
Figure 14:
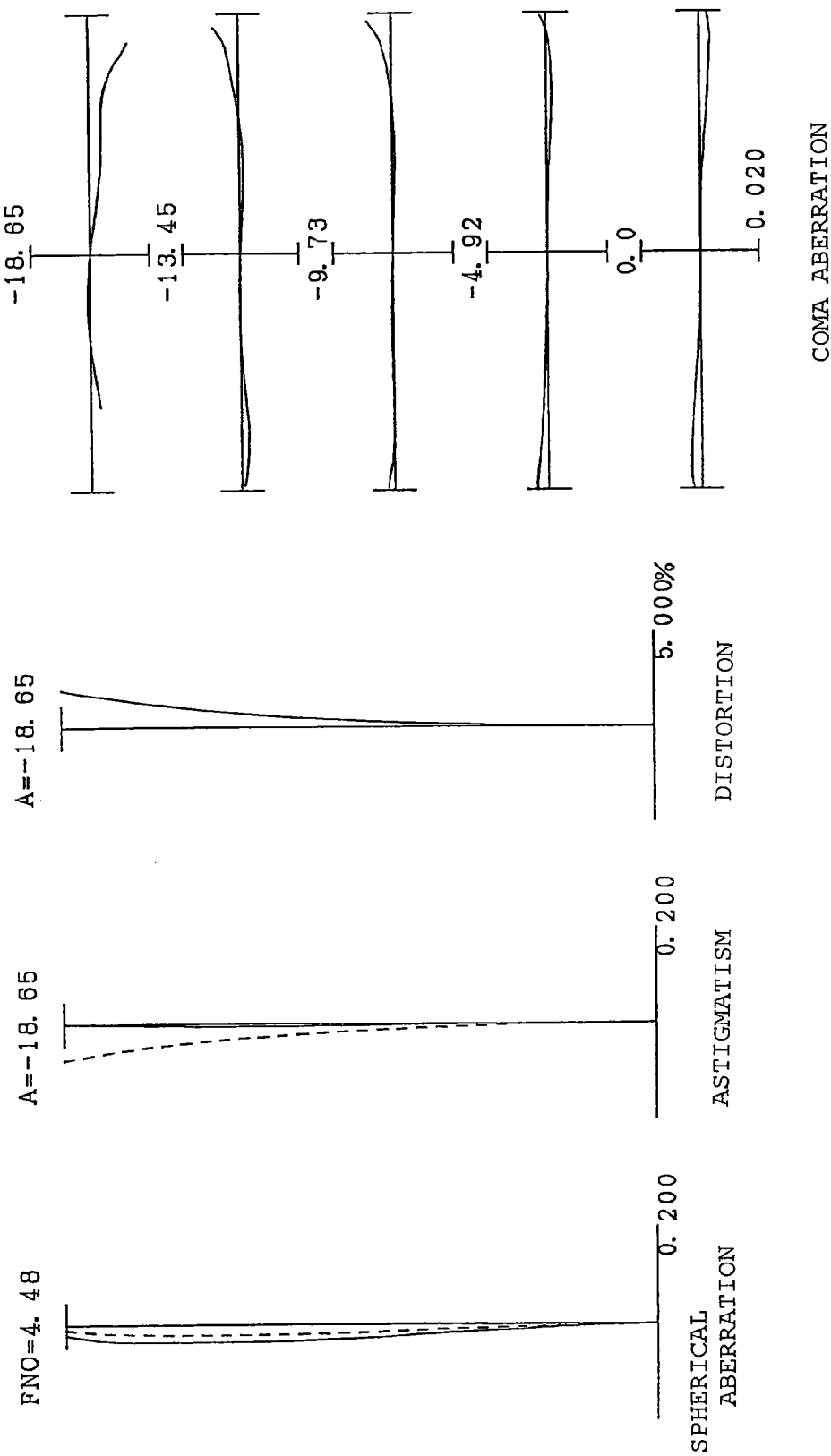
FIG. 14 is a graph showing various aberrations of the zoom lens according to Example 3 upon focusing on infinity in the intermediate focal length state.
Figure 15:
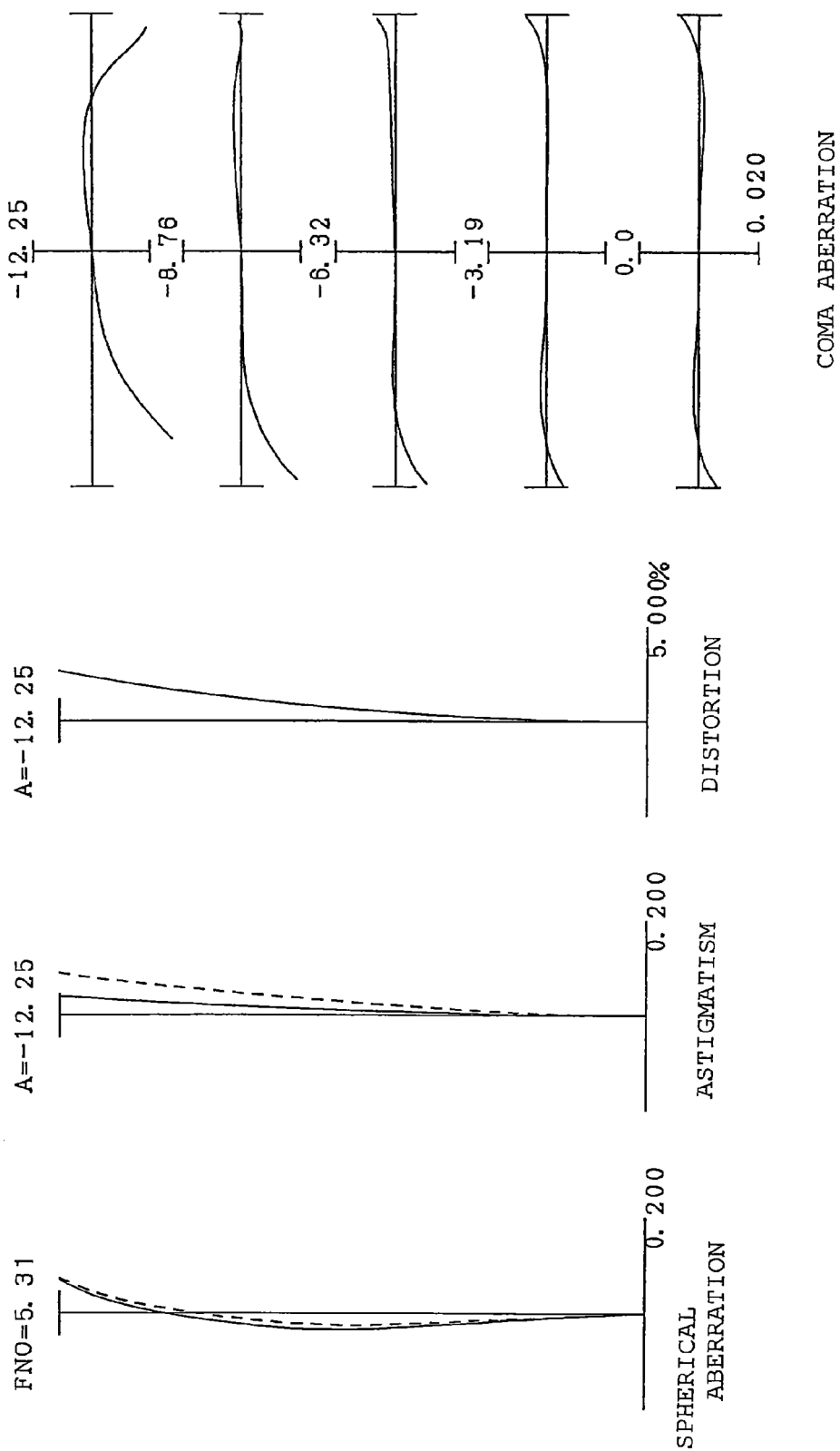
FIG. 15 is a graph showing various aberrations of the zoom lens according to Example 3 upon focusing on infinity in the telephoto end state.

FIGS. 13 to 15 are graphs showing various aberrations for Example 3 with respect to d-line (wavelength λ=587.6 nm). That is, FIG. 13 is a graph showing various aberrations of the zoom lens according to Example 3 upon focusing on infinity in the wide-angle end state (f=4.76 mm); FIG. 14 is a graph showing various aberrations of the zoom lens according to Example 3 upon focusing on infinity in the intermediate focal length state (f=10.90 mm); and FIG. 15 is a graph showing various aberrations of the zoom lens according to Example 3 upon focusing on infinity in the telephoto end state (f=16.83 mm). Furthermore, as is evident from the respective aberration graphs, it is clear that, according to Example 3, the various aberrations are favorably corrected in the respective focal length states from the wide-angle end state to the telephoto end state and Example 3 possesses superior image formation performance.

Fourth Example

Figure 16:
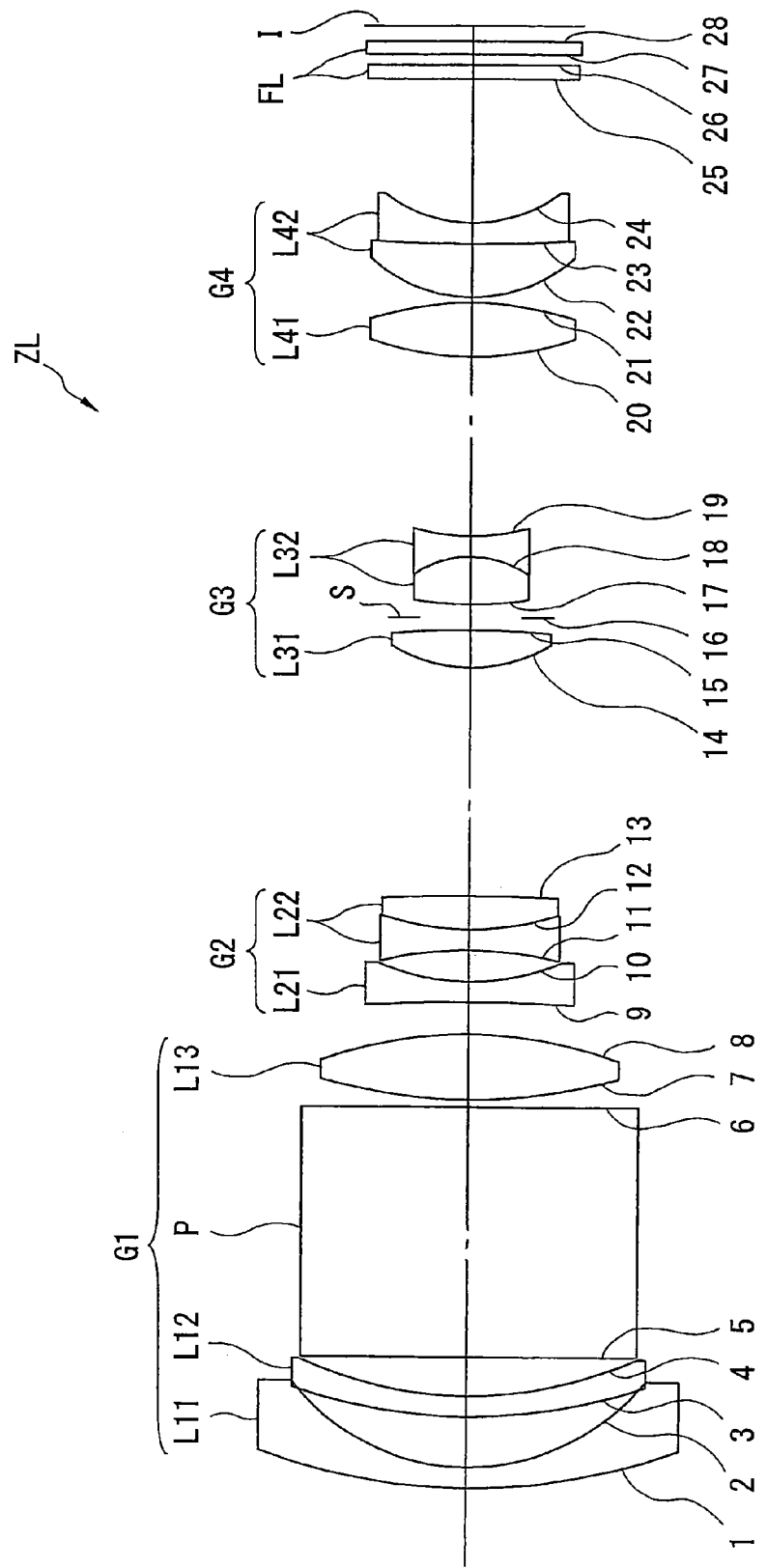
FIG. 16 is a cross-sectional view of the constitution of the zoom lens according to Example 4.

Example 4 of this application will be described hereinbelow with reference to FIGS. 16 to 19 and Table 4. FIG. 16 shows the constitution of the zoom lens according to Example 4. The zoom lens of Example 4 has the same constitution as that of the zoom lens of Example 1 except for the constitution of the second lens group and a detailed description is omitted by assigning the same reference numerals to the respective parts as in the case of Example 1. The second lens group G2 of Example 4 comprises, in order from the object, a two-sided concave shape negative lens L21 which has an aspherical surface on the image and a negative composite lens L22 made by sticking together a two-sided concave shape negative lens and a two-sided convex shape positive lens whose.

Table 4 below shows the respective parameters of Example 4. The surface numbers 1 to 28 of Table 4 correspond to the surfaces 1 to 28 in FIG. 16. Further, according to Example 4, the respective lens surfaces of the seventh, tenth, fourteenth and twenty-first surfaces are formed with an aspherical shape.

TABLE 4

[All parameters]

| Wide-angle end | Intermediate focal length | Telephoto end |
|---|---|---|
| f = 4.76 to | 10.83 to | 16.83 |
| F.No = 3.69 to | 4.63 to | 5.63 |
| 2ω = 80.12 to | 37.46 to | 24.50 |

[Lens parameters]

| Surface number | Radius of curvature | Surface distance | Refractive index | Abbe number |
|---|---|---|---|---|
| 1 | 24.0157 | 0.80 | 1.94594 | 17.98 |
| 2 | 8.8935 | 1.93 | | |
| 3 | 21.2986 | 0.80 | 2.00069 | 25.46 |
| 4 | 16.1029 | 1.50 | | |
| 5 | 0.0000 | 9.60 | 1.88300 | 40.76 |
| 6 | 0.0000 | 0.30 | | |
| 7* | 19.6885 | 2.55 | 1.77377 | 47.17 |
| 8 | −16.7162 | (d8) | | |
| 9 | −71.9418 | 0.80 | 1.85135 | 40.10 |
| 10* | 9.2063 | 1.22 | | |
| 11 | −14.8404 | 0.80 | 1.81600 | 46.62 |
| 12 | 10.8518 | 1.31 | 1.94594 | 17.98 |
| 13 | −67.4208 | (d13) | | |
| 14* | 5.9953 | 1.45 | 1.58913 | 61.25 |
| 15 | −36.9608 | 0.50 | | |
| 16 | 0.0000 | 0.50 | | (aperture stop S) |
| 17 | 13.8168 | 1.85 | 1.64000 | 60.08 |
| 18 | −4.0035 | 0.80 | 1.83481 | 42.71 |
| 19 | 8.2259 | (d19) | | |
| 20 | 11.9130 | 2.09 | 1.58913 | 61.25 |
| 21* | −11.2129 | 0.20 | | |
| 22 | 5.9451 | 2.05 | 1.49700 | 81.54 |
| 23 | 64.9268 | 0.80 | 1.84666 | 23.78 |
| 24 | 5.6786 | (d24) | | |
| 25 | 0.0000 | 0.55 | 1.54437 | 70.51 |
| 26 | 0.0000 | 0.40 | | |
| 27 | 0.0000 | 0.50 | 1.51633 | 64.14 |
| 28 | 0.0000 | (Bf) | | |

[Aspherical surface data]

| Surface number | K | C4 | C6 | C8 | C10 |
|---|---|---|---|---|---|
| 7 | −3.6294 | $+1.6073 \times 10^{-5}$ | $-4.6863 \times 10^{-7}$ | $+4.0036 \times 10^{-9}$ | $-2.0969 \times 10^{-11}$ |
| 10 | −9.0000 | $+1.5122 \times 10^{-3}$ | $-5.1954 \times 10^{-5}$ | $+1.0103 \times 10^{-6}$ | $+3.8507 \times 10^{-8}$ |
| 14 | +0.4518 | $+1.7174 \times 10^{-4}$ | $+1.9840 \times 10^{-5}$ | $+1.6119 \times 10^{-8}$ | $+4.3659 \times 10^{-8}$ |
| 21 | +6.5379 | $+8.9943 \times 10^{-4}$ | $+2.2966 \times 10^{-5}$ | $-4.2505 \times 10^{-7}$ | $+8.1325 \times 10^{-8}$ |

[Variable distance]

| | Wide-angle end | Intermediate focal length | Telephoto end |
|---|---|---|---|
| f | 4.7600 | 10.8344 | 16.8300 |
| d8 | 1.2428 | 7.0385 | 9.0846 |
| d13 | 8.8916 | 3.0958 | 1.0500 |
| d19 | 6.9489 | 3.3971 | 1.1000 |
| d24 | 5.5049 | 9.0566 | 11.3537 |
| Bf | 0.5998 | 0.5999 | 0.5998 |

[Condition mapping values]

nd1 = 1.94594
nd2 = 2.00069
vd1 = 17.98
vd2 = 25.46
L1 = 5.034
Lp = 9.600
fw = 4.75998
f1 = 15.92586
f2 = −7.44907
ndp = 1.88300
Conditional expression (1) nd1 = 1.94594
Conditional expression (2) nd2 = 2.00069
Conditional expression (3) nd1/nd2 = 0.973
Conditional expression (4) vd1 = 17.98
Conditional expression (5) vd2 = 25.46

TABLE 4-continued

Conditional expression (6) vd1/vd2 = 0.706
Conditional expression (7) L1/Lp = 0.524
Conditional expression (8) f1/(−f2) = 2.138
Conditional expression (9) (−f2)/fw = 1.565
Conditional expression (10) ndp = 1.88300

Thus, it is clear that the above conditional expressions (1) to (10) are all satisfied by this example. It is also clear that L1=5.034 for Lp=9.600 and L1 can be small in comparison with the prior art.

Figure 17:
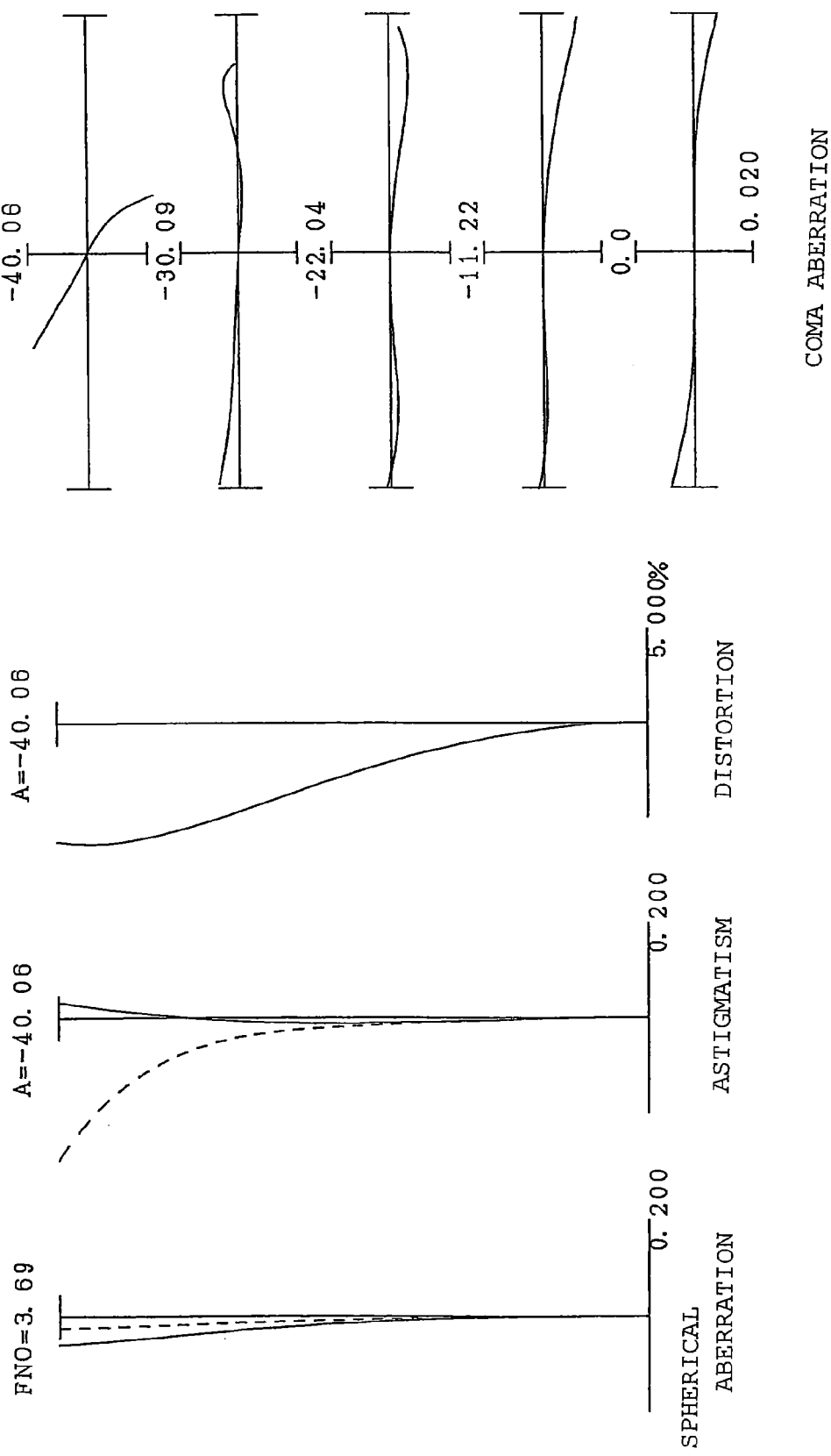
FIG. 17 is a graph showing various aberrations of the zoom lens according to Example 4 upon focusing on infinity in the wide-angle end state.
Figure 18:
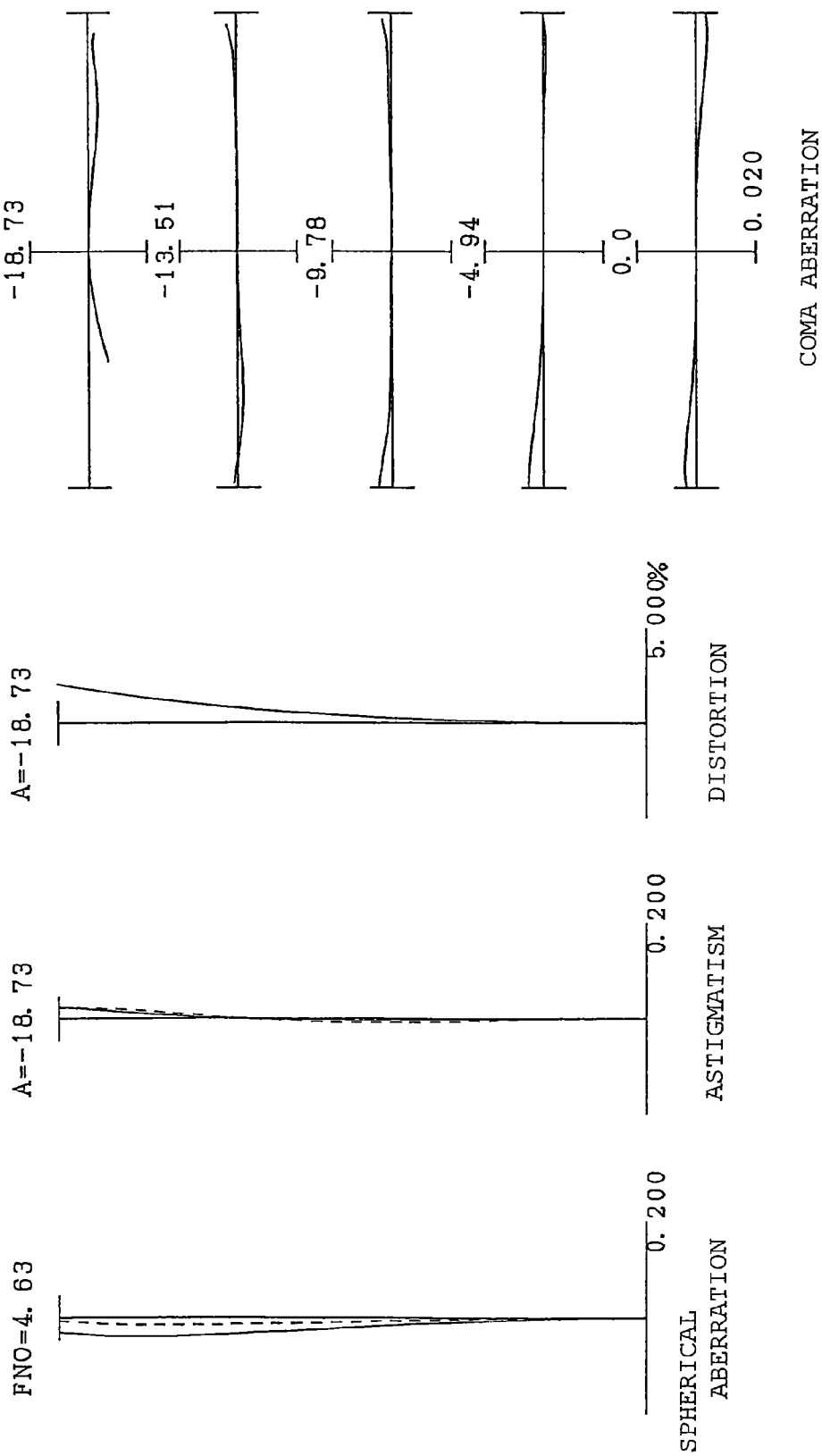
FIG. 18 is a graph showing various aberrations of the zoom lens according to Example 4 upon focusing on infinity in the intermediate focal length state.
Figure 19:
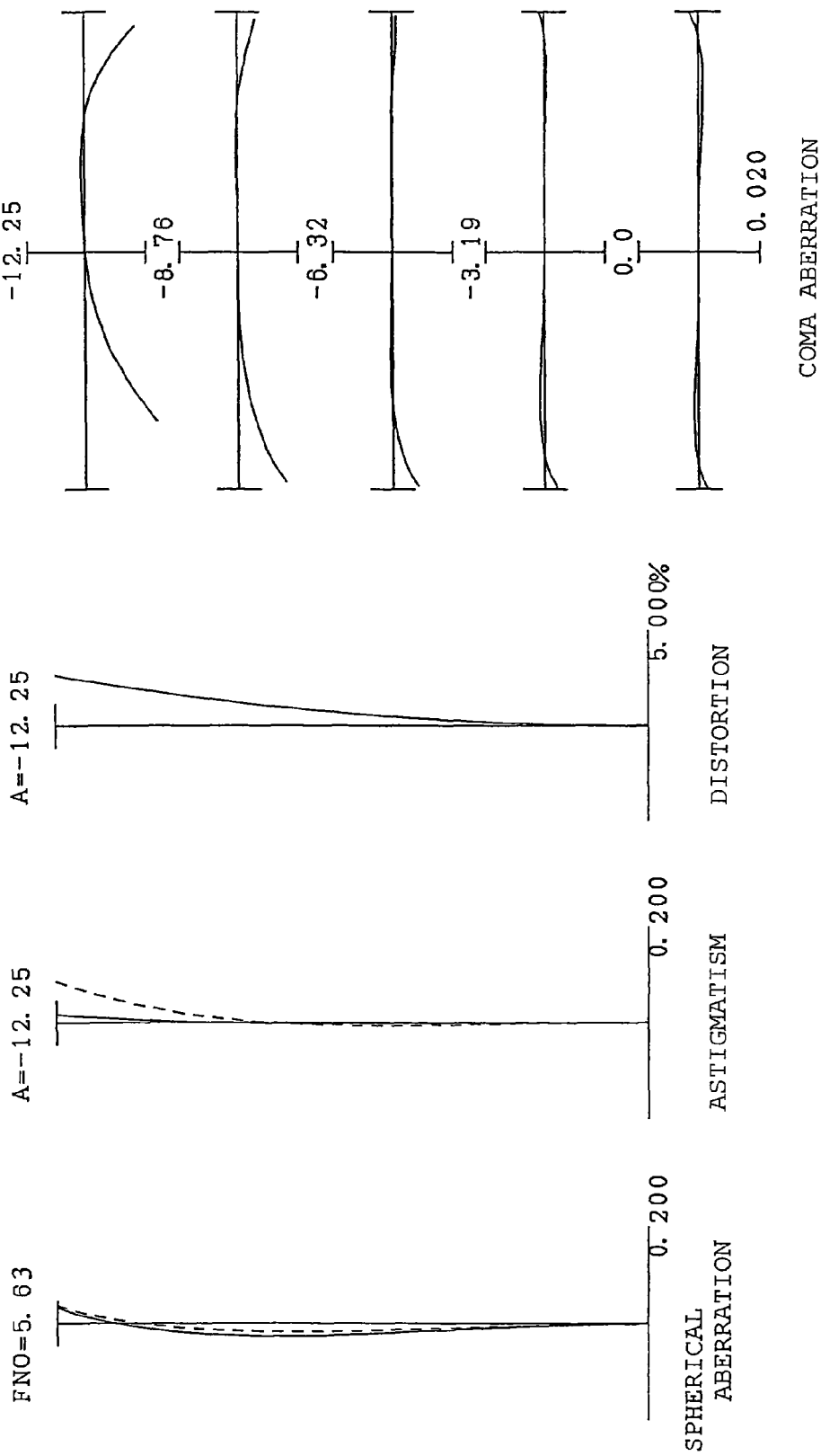
FIG. 19 is a graph showing various aberrations of the zoom lens according to Example 4 upon focusing on infinity in the telephoto end state.

FIGS. 17 to 19 are graphs showing various aberrations for Example 4 with respect to d-line (wavelength λ=587.6 nm). That is, FIG. 17 is a graph showing various aberrations of the zoom lens according to Example 4 upon focusing on infinity in the wide-angle end state (f=4.76 mm); FIG. 18 is a graph showing various aberrations of the zoom lens according to Example 4 upon focusing on infinity in the intermediate focal length state (f=10.83 mm); and FIG. 19 is a graph showing various aberrations of the zoom lens according to Example 4 upon focusing on infinity in the telephoto end state (f=16.83 mm). Furthermore, as is evident from the respective aberration graphs, it is clear that, according to Example 4, the various aberrations are favorably corrected in the respective focal length states from the wide-angle end state to the telephoto end state and Example 4 possesses superior image formation performance.

Fifth Example

Figure 20:
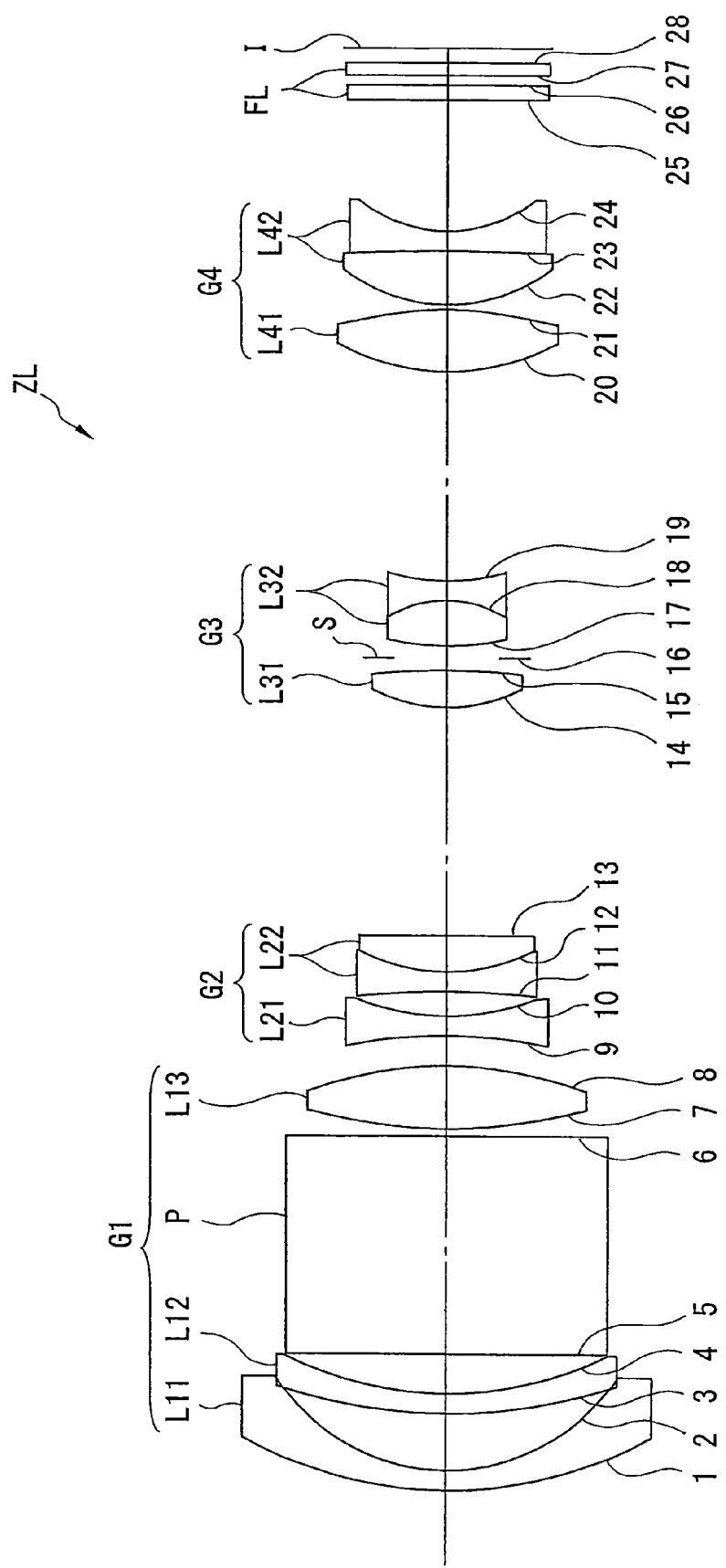
FIG. 20 is a cross-sectional view of the constitution of the zoom lens according to Example 5.

Example 5 of this application will be described hereinbelow with reference to FIGS. 20 to 23 and Table 5. FIG. 20 shows the constitution of the zoom lens according to Example 5. The zoom lens of Example 5 has the same constitution as that of the zoom lens of Example 1 except for the constitution of the second lens group and fourth lens group and a detailed description is omitted by assigning the same reference numerals to the respective parts as in the case of Example 1. The second lens group G2 of Example 5 comprises, in order from the object, a two-sided concave shape negative lens L21 which has an aspherical surface on the image and a negative composite lens L22 made by sticking together a two-sided concave shape negative lens and a two-sided convex shape positive lens. The fourth lens group G4 of Example 5 comprises, in order from the object, a two-sided convex shape positive lens L41 which has an aspherical surface on the image and a negative composite lens L42 made by sticking together a two-sided convex shape positive lens and a two-sided concave shape negative lens.

Table 5 below shows the respective parameters of Example 5. The surface numbers 1 to 28 of Table 5 correspond to the surfaces 1 to 28 in FIG. 20. Further, according to Example 5, the respective lens surfaces of the seventh, tenth, fourteenth and twenty-first surfaces are formed with an aspherical shape.

TABLE 5

| [All parameters] | | | | |
|---|---|---|---|---|
| Wide-angle end | | Intermediate focal length | | Telephoto end |
| f = 4.76 | to | 10.83 | to | 19.20 |
| F.No = 3.47 | to | 4.34 | to | 5.75 |
| 2ω = 80.20 | to | 37.30 | to | 21.54 |

| [Lens parameters] | | | | |
|---|---|---|---|---|
| Surface number | Radius of curvature | Surface distance | Refractive index | Abbe number |
| 1 | 17.2732 | 0.80 | 1.94594 | 17.98 |
| 2 | 8.3539 | 2.29 | | |
| 3 | 22.2424 | 0.80 | 2.00069 | 25.46 |
| 4 | 14.8265 | 1.60 | | |
| 5 | 0.0000 | 8.80 | 1.88300 | 40.76 |
| 6 | 0.0000 | 0.30 | | |
| 7* | 19.9314 | 2.56 | 1.76802 | 49.24 |
| 8 | −16.2242 | (d8) | | |
| 9 | −21.2094 | 0.80 | 1.85135 | 40.10 |
| 10* | 9.8366 | 1.00 | | |
| 11 | −34.3738 | 0.80 | 1.83481 | 42.71 |
| 12 | 7.9969 | 1.47 | 1.94594 | 17.98 |
| 13 | −1158.0055 | (d13) | | |
| 14* | 6.6673 | 1.51 | 1.59201 | 67.05 |
| 15 | −28.2642 | 0.50 | | |
| 16 | 0.0000 | 0.50 | | (aperture stop S) |
| 17 | 11.6221 | 1.85 | 1.64000 | 60.08 |
| 18 | −4.6955 | 0.80 | 1.88300 | 40.76 |
| 19 | 8.8567 | (d19) | | |
| 20 | 9.5123 | 2.50 | 1.59201 | 67.05 |
| 21* | −12.9644 | 0.20 | | |
| 22 | 7.1445 | 2.15 | 1.49700 | 81.54 |
| 23 | −85.6130 | 0.80 | 1.79504 | 28.54 |
| 24 | 5.8608 | (d24) | | |
| 25 | 0.0000 | 0.60 | 1.54437 | 70.51 |
| 26 | 0.0000 | 0.40 | | |

TABLE 5-continued

| 27 | 0.0000 | 0.50 | 1.51633 | 64.14 |
| 28 | 0.0000 | (Bf) | | |

[Aspherical surface data]

| Surface number | K | C4 | C6 | C8 | C10 |
|---|---|---|---|---|---|
| 7 | −7.6332 | $+8.1356 \times 10^{-5}$ | $-1.1855 \times 10^{-6}$ | $+1.0910 \times 10^{-8}$ | $-6.9554 \times 10^{-11}$ |
| 10 | −9.0000 | $+1.1174 \times 10^{-3}$ | $-4.2945 \times 10^{-5}$ | $+1.3369 \times 10^{-6}$ | $-3.3511 \times 10^{-9}$ |
| 14 | +0.4936 | $+1.6354 \times 10^{-4}$ | $+5.3401 \times 10^{-6}$ | $+9.8630 \times 10^{-7}$ | $-2.7231 \times 10^{-8}$ |
| 21 | +2.0477 | $+5.2136 \times 10^{-4}$ | $+6.2688 \times 10^{-7}$ | $+2.6776 \times 10^{-7}$ | $-1.2539 \times 10^{-8}$ |

[Variable distance]

| | Wide-angle end | Intermediate focal length | Telephoto end |
|---|---|---|---|
| f | 4.7600 | 10.8344 | 19.2000 |
| d8 | 1.2308 | 7.1168 | 9.5209 |
| d13 | 9.3400 | 3.4541 | 1.0500 |
| d19 | 8.5106 | 4.5925 | 1.1000 |
| d24 | 5.2744 | 9.1924 | 12.6849 |
| Bf | 0.5999 | 0.6000 | 0.6000 |

[Condition mapping values]

nd1 = 1.94594
nd2 = 2.000694
vd1 = 17.98
vd2 = 25.46
L1 = 5.498
Lp = 8.800
fw = 4.75999
f1 = 16.35427
f2 = −7.24275
ndp = 1.88300
Conditional expression (1) nd1 = 1.94594
Conditional expression (2) nd2 = 2.000694
Conditional expression (3) nd1/nd2 = 0.973
Conditional expression (4) vd1 = 17.98
Conditional expression (5) vd2 = 25.46
Conditional expression (6) vd1/vd2 = 0.706
Conditional expression (7) L1/Lp = 0.625
Conditional expression (8) f1/(−f2) = 2.258
Conditional expression (9) (−f2)/fw = 1.522
Conditional expression (10) ndp = 1.88300

Thus, it is clear that the above conditional expressions (1) to (10) are all satisfied by this example. It is also clear that L1=5.498 for Lp=8.800 and L1 can be small in comparison with the prior art.

Figure 21:
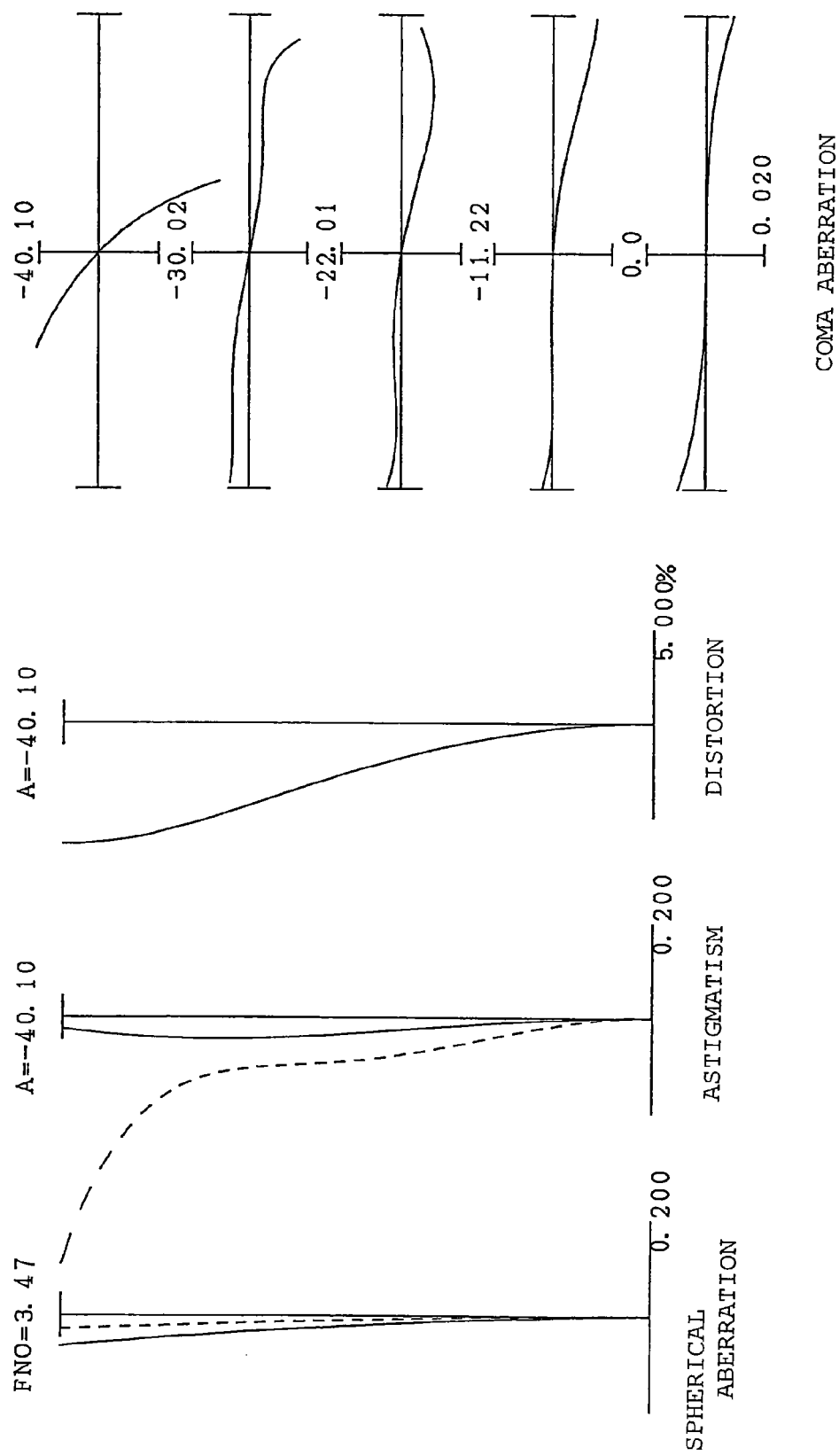
FIG. 21 is a graph showing various aberrations of the zoom lens according to Example 5 upon focusing on infinity in the wide-angle end state.
Figure 22:
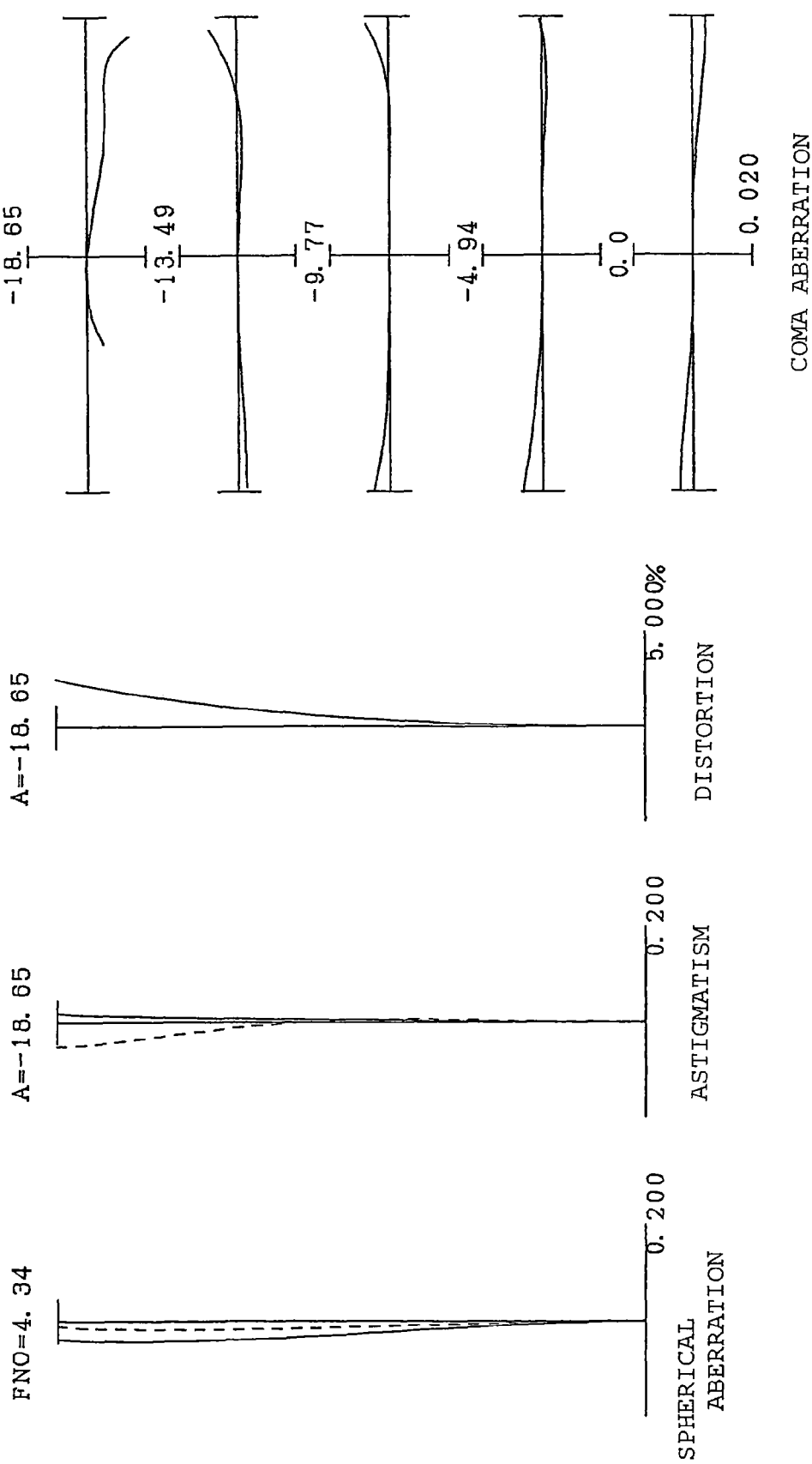
FIG. 22 is a graph showing various aberrations of the zoom lens according to Example 5 upon focusing on infinity in the intermediate focal length state.
Figure 23:
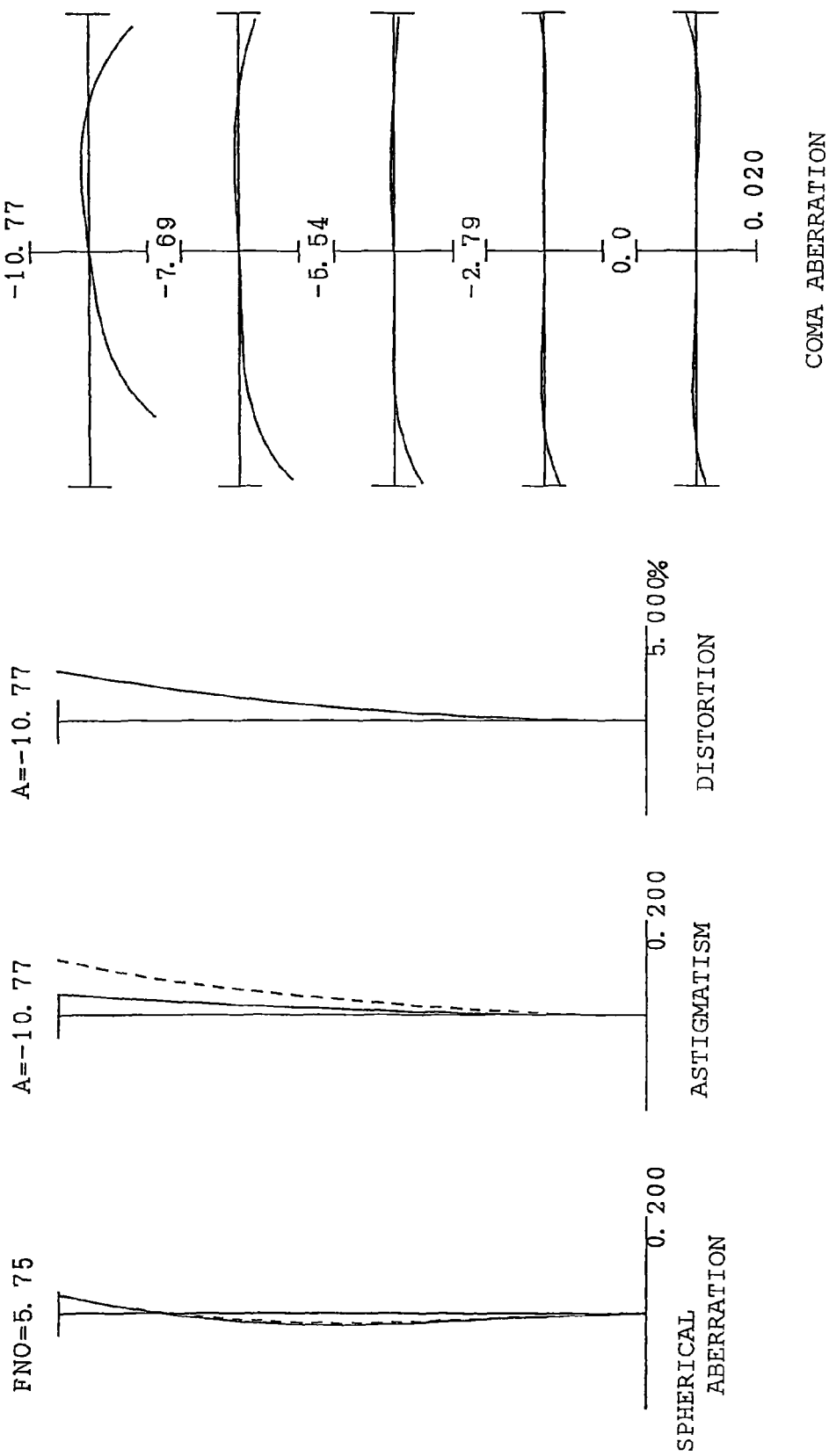
FIG. 23 is a graph showing various aberrations of the zoom lens according to Example 5 upon focusing on infinity in the telephoto end state.

FIGS. 21 to 23 are graphs showing various aberrations for Example 5 with respect to d-line (wavelength λ=587.6 nm). That is, FIG. 21 is a graph showing various aberrations of the zoom lens according to Example 5 upon focusing on infinity in the wide-angle end state (f=4.76 mm); FIG. 22 is a graph showing various aberrations of the zoom lens according to Example 5 upon focusing on infinity in the intermediate focal length state (f=10.83 mm); and FIG. 23 is a graph showing various aberrations of the zoom lens according to Example 5 upon focusing on infinity in the telephoto end state (f=19.20 mm). Furthermore, as is evident from the respective aberration graphs, it is clear that, according to Example 5, the various aberrations are favorably corrected in the respective focal length states from the wide-angle end state to the telephoto end state and Example 5 possesses superior image formation performance.

The following content can be suitably adopted for the above examples within a range that does not impair the optical performance.

Although a four-group constitution is shown for the zoom lens in each of the above examples, the present invention can also be applied to other group constitutions such as, two, three or five group constitutions. Furthermore, another lens group can be added between the respective lens groups or the other lens groups can be added adjacent to the image or object of the zoom lens system.

Moreover, by moving a single lens group or a plurality of lens groups or a partial lens group in the direction of the optical axis, a focusing lens group that focuses on objects ranging from infinite objects to short-range objects may be established. The focusing lens group can also be applied to autofocus and is also suited to the driving of an autofocus motor (using an ultrasound motor or the like). In particular, in the case of a four-group constitution, the focusing lens group is preferably the second or fourth lens group.

Moreover, by moving the lens group or partial lens group in a direction that is perpendicular to the optical axis, a vibration-proof lens group that corrects image shake caused by hand shake may also be produced. In particular, the third lens group is preferably rendered a vibration-proof lens group but the second lens group may also be a vibration-proof lens group.

In addition, the respective lens surfaces may be aspherical surfaces. Here, an aspherical surface which is produced by grinding, a glass mold aspherical surface produced by forming glass in an aspherical shape in a mold, or a composite aspherical surface produced by forming resin in an aspherical shape on the surface of glass is possible.

Furthermore, the aperture stop is preferably disposed in the third lens group or close to the third lens group (lens group comprising shift lens group). However, instead of providing an aperture stop member, the role of the aperture stop may also be replaced with a lens frame.

In addition, an antireflection film with a high transmittance over a wide bandwidth can be provided on each lens surface in order to be able to achieve a high optical performance which achieves a high contrast and reduces flare and ghosting.

Although the constitutional requirements of this example were described in order to explain the present invention in a way that facilitates understanding, it goes without saying that the present invention is not limited to these constitutional requirements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens having a plurality of lens groups which are disposed in order from the object, wherein a first lens group that is disposed closest to the object among the plurality of lens groups has positive refractive power and comprises a light path bending element which bends the path of light and a plurality of lens components which are disposed closer to the object than the light path bending element;
    the plurality of lens components comprise at least one negative lens whose refractive index with respect to d-line exceeds 1.90; and
    the field of view in the wide-angle end state is equal to or more than 75 degrees.

2. The zoom lens according to claim 1, wherein, the following conditional expressions $$nd1>1.90 \text{ and}$$

$$nd2>1.90$$

are satisfied,
    where the refractive index with respect to d-line of a negative lens closest to the object among the plurality of lens components is nd1, and
    where the refractive index with respect to d-line of the negative lens closest to the image among the plurality of lens components is nd2.

3. The zoom lens according to claim 1, wherein the plurality of lens components consist of two negative lenses airspaced along the optical axis.

4. The zoom lens according to claim 1, wherein, the following conditional expression $$0.7<nd1/nd2<1.1$$

is satisfied,
    where the refractive index with respect to d-line of the negative lens closest to the object among the plurality of lens components is nd1 and the refractive index with respect to d-line of the negative lens closest to the image among the plurality of lens components is nd2.

5. The zoom lens according to claim 1, wherein, the following conditional expressions $$vd1<50 \text{ and}$$

$$vd2<50$$

are satisfied,
    where the Abbe number with respect to d-line of the negative lens closest to the object among the plurality of lens components is vd1, and
    where the Abbe number with respect to d-line of the negative lens closest to the image among the plurality of lens components is vd2.

6. The zoom lens according to claim 1, wherein the following conditional expression $$0.4<vd1/vd2<1.3$$

is satisfied,
    where the Abbe number with respect to d-line of the negative lens closest to the object among the plurality of lens components is vd1 and the Abbe number with respect to d-line of the negative lens closest to the image among the plurality of lens components is vd2.

7. The zoom lens according to claim 1, wherein, the following conditional expression $$L1/Lp<1.0$$

is satisfied,
    where the light path bending element is a prism, and the distance on the optical axis from the surface closest to the object to the prism in the first lens group is L1 and the distance on the optical axis of the prism is Lp.

8. The zoom lens according to claim 1, wherein, the following conditional expression $$1.9<f1/(-f2)<2.5$$

is satisfied,
    where the focal length of the first lens group is f1 and the focal length of a second lens group which is disposed to an image side of the first lens group among the plurality of lens groups is f2.

9. The zoom lens according to claim 1, wherein a second lens group which is disposed to an image side of the first lens group among the plurality of lens groups has negative refractive index; and,
    the following conditional expression $$1.2<(-f2)/fw<1.8$$

is satisfied,
    where a focal length of the zoom lens in the wide-angle end state is fw and the focal length of the second lens group is f2.

10. The zoom lens according to claim 1, wherein, the following conditional expression $$ndp>1.80$$

is satisfied,
    where the light path bending element is a prism, and the refractive index with respect to d-line of the prism is ndp.

11. The zoom lens according to claim 1, wherein the plurality of lens groups comprises, in order from the object, the first lens group, the second lens group, a third lens group, and a fourth lens group.

12. The zoom lens according to claim 11, wherein the second lens group has negative refractive power, the third lens group has positive refractive power, and the fourth lens group has positive refractive power.

13. The zoom lens according to claim 11, wherein the first lens group and the third lens group are fixed during zooming from the wide-angle end to the telephoto end; and
    the second lens group and the fourth lens group move along the optical axis during zooming from the wide-angle end to the telephoto end.

14. The zoom lens according to claim 1, wherein the plurality of lens components comprises a negative meniscus lens having a convex surface facing the object.

15. The zoom lens according to claim 1, wherein the first lens group comprises a positive lens which is disposed closer to the image than the light path bending element.

16. The zoom lens according to claim 1, wherein the first lens group has a lens component with an aspherical surface.

17. An optical apparatus equipped with the zoom lens according to claim 1.

18. A method for forming an image of an object that uses a zoom lens which has a plurality of lens groups which are disposed in order from the object to form an image of an object on a predetermined surface, wherein a first lens group which is disposed closest to the object among the plurality of lens groups is afforded positive refractive power;

the first lens group is provided with a light path bending element which bends the path of light and a plurality of lens components are disposed closer to the object than the light path bending element;

the plurality of lens components comprise at least one negative lens whose refractive index with respect to d-line exceeds 1.90; and the field of view in the wide-angle end state is equal to or more than 75 degrees.

19. The method according to claim 18, wherein, the following conditional expressions $nd1 > 1.90$ and $nd2 > 1.90$ are satisfied, where the refractive index with respect to d-line of a negative lens closest to the object among the plurality of lens components is nd1, and where the refractive index with respect to d-line of the negative lens closest to the image among the plurality of lens components is nd2.

20. The method according to claim 18, wherein the plurality of lens components consist of two negative lenses airspaced along the optical axis.

21. The method according to claim 18, wherein, the following conditional expression $0.7 < nd1/nd2 < 1.1$ is satisfied, where the refractive index with respect to d-line of the negative lens closest to the object among the plurality of lens components is nd1 and the refractive index with respect to d-line of the negative lens closest to the image among the plurality of lens components is nd2.

22. The method according to claim 18, wherein, the following conditional expressions $vd1 < 50$ and $vd2 < 50$ are satisfied, where the Abbe number with respect to d-line of the negative lens closest to the object among the plurality of lens components is vd1, and where the Abbe number with respect to d-line of the negative lens closest to the image among the plurality of lens components is vd2.

23. The method according to claim 18, wherein the following conditional expression $0.4 < vd1/vd2 < 1.3$ is satisfied, where the Abbe number with respect to d-line of the negative lens closest to the object among the plurality of lens components is vd1 and the Abbe number with respect to d-line of the negative lens closest to the image among the plurality of lens components is vd2.

24. The method according to claim 18, wherein the plurality of lens components comprises a negative meniscus lens having a convex surface facing the object.

* * * * *